United States Patent
Huang et al.

(10) Patent No.: US 8,966,131 B2
(45) Date of Patent: Feb. 24, 2015

(54) SYSTEM METHOD FOR BI-DIRECTIONAL TUNNELING VIA USER INPUT BACK CHANNEL (UIBC) FOR WIRELESS DISPLAYS

(71) Applicant: QUALCOMM Incorporated, San Diego, CA (US)

(72) Inventors: Xiaolong Huang, San Diego, CA (US); Vijayalakshmi R. Raveendran, San Diego, CA (US); Jeffree S. Froelicher, San Diego, CA (US); Xiaodong Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/678,988

(22) Filed: Nov. 16, 2012

(65) Prior Publication Data
US 2013/0179605 A1    Jul. 11, 2013

Related U.S. Application Data

(60) Provisional application No. 61/583,914, filed on Jan. 6, 2012.

(51) Int. Cl.
*G06F 3/038*    (2013.01)
*G06F 13/10*    (2006.01)

(52) U.S. Cl.
USPC ............ 710/20; 710/15; 710/16; 710/17; 710/18; 710/19; 345/156; 345/163; 725/81; 725/118

(58) Field of Classification Search
USPC .......... 710/15–20; 345/163, 156; 725/118, 81
See application file for complete search history.

(56) References Cited

U.S. PATENT DOCUMENTS

| | | | |
|---|---|---|---|
| 7,646,739 B2 | 1/2010 | Previdi et al. | |
| 7,774,362 B2 | 8/2010 | Dong | |
| 7,830,923 B2 | 11/2010 | Wang et al. | |
| 8,102,849 B2* | 1/2012 | Martinez Bauza et al. | 370/390 |
| 8,373,688 B2* | 2/2013 | Jeon et al. | 345/204 |
| 8,437,347 B2* | 5/2013 | Casaccia et al. | 370/390 |
| 2008/0066124 A1* | 3/2008 | Igoe et al. | 725/81 |
| 2011/0082939 A1* | 4/2011 | Montemurro et al. | 709/227 |
| 2011/0107388 A1* | 5/2011 | Lee et al. | 725/118 |
| 2011/0265129 A1 | 10/2011 | Na et al. | |

(Continued)

FOREIGN PATENT DOCUMENTS

| | | |
|---|---|---|
| EP | 2328306 A1 | 6/2011 |
| WO | 2012100193 A1 | 7/2012 |

OTHER PUBLICATIONS

International Search Report and Written Opinion—PCT/US2013/020168—ISA/EPO—Apr. 18, 2013.

(Continued)

*Primary Examiner* — Tammara Peyton
(74) *Attorney, Agent, or Firm* — Donald C. Kordich

(57) ABSTRACT

This disclosure describes a method of establishing a bi-directional user interface back channel (UIBC) to a computing device, receiving encapsulated peripheral data from the computing device using the UIBC, and decapsulating the peripheral data, as well as a method of establishing a bi-directional user interface back channel (UIBC) to a computing device, receiving peripheral data, encapsulating the peripheral data, and transmitting the encapsulated peripheral data to the computing device using the UIBC.

32 Claims, 14 Drawing Sheets

(56) References Cited

U.S. PATENT DOCUMENTS

2013/0009873 A1    1/2013   Huang et al.
2013/0246565 A1*   9/2013   Froelicher et al. ............ 709/217
2013/0304794 A1*  11/2013   Verma et al. .................. 709/201

OTHER PUBLICATIONS

Wi-Fi Alliance Member Symposium, [Online] Jan. 1, 2011, XP055046396, Retrieved from the Internet: URL:http://www.wi-fi.org/files/20110421_china_Symposia_full_merge.pdf, Retrieved on Dec. 2, 2012.

Hirofuchi T et al, "USB/IP—a Peripheral Bus Extension for Device Sharing over IP Network", Proceedings of the USENIX Annual Technical Conference, XX, XX, Jan. 1, 2005, pp. 47-60, XP007901448,.

Sadeghi, et al., "WSE draft 1.03," Wireless Gigabit Alliance (WGA) Inc., WGA Specification, WGA PAL Working Group, Aug. 8, 2012, pp. 1-110.

Wi-Fi Alliance, "Wi-Fi Certified MiracastTM Extending the Wi-Fi experience to seamless video display", https://www.wi-fi.org/sites/default/files/uploads/wp_Miracast_Industry_20120919.pdf, pp. 3-12, Sep. 19, 2012.

* cited by examiner

SYSTEM METHOD FOR BI-DIRECTIONAL TUNNELING VIA USER INPUT BACK CHANNEL (UIBC) FOR WIRELESS DISPLAYS

This application claims the benefit of U.S. Provisional Application No. 61/583,914 filed 6 Jan. 2012, the entire content of which is incorporated herein by reference.

TECHNICAL FIELD

This disclosure relates to techniques for transmitting data between a source device and a sink device, and more particularly, to techniques and protocols that support the transmission of user input data from the sink device to the source device.

BACKGROUND

Wireless display (WD) or Wi-Fi Display (WFD) systems include a source device and one or more sink devices. The source device and each of the sink devices may be either mobile devices or wired devices with wireless communication capabilities. One or more of the source and the sink(s) may, for example, include mobile telephones, tablet computers, portable computers with wireless communication cards, personal digital assistants (PDAs), portable media players, or other such devices with wireless communication capabilities, including so-called "smart" phones and "smart" pads or tablets, or other types of wireless communication devices. One or more of the source device and the sink devices may also include wired devices such as televisions, desktop computers, monitors, projectors, and the like, that include communication capabilities.

The source device sends media data, such as audio video (AV) data, to one or more of the sink device(s) participating in a particular media share session. The media data may be played back at both a local display of the source device and at each of the displays of the sink devices. More specifically, each of the participating sink devices renders the received media data on its screen and audio equipment.

SUMMARY

In general, this disclosure relates to techniques that enable a source device and one or more sink devices in a Wireless Display (WD) system to extend a User Interface Back Channel (UIBC) to support bi-directional communication over the UIBC. A source and a sink device may implement WD communication techniques that are compliant with standards such as, WirelessHD, Wireless Home Digital Interface (WHDI), WiGig, Wireless USB and the Wi-Fi Display (WFD) standard currently under development. Additional information about the WFD standard may be found in Wi-Fi Alliance, "Wi-Fi Display Specification draft version 1.31," Wi-Fi Alliance Technical Committee, Display Task Group, which is hereby incorporated by reference in its entirety. A WD system may utilize the extended UIBC to allow a source device to communicate with one or more peripherals that are connected one of the one or more sink devices. It can be advantageous to enable the source device to communicate with sink peripherals, for example if a sink device and/or sink peripheral is located more closely to a user than the source device, thereby making connection of the peripheral to the sink device more convenient than to the source device. The techniques of this disclosure may allow for "wireless docking," in which a source device may communicate with peripheral sink devices when the source is in wireless communication range with the sink device. The current WFD standard, however, does not include a mechanism by which the source device can communicate with sink peripherals other than various types of input devices.

Aspects of this disclosure relate to a computing device configured to act as a sink device, and to tunnel peripheral data using a UIBC to and from source device. In order to tunnel the peripheral data, the UIBC is extended to support an additional "tunneling" category of user input. As an example, source and sink devices may utilize UIBC packets having the additional tunneling UIBC input category to encapsulate peripheral data, including peripheral device commands of sink peripherals. By encapsulating peripheral data within UIBC packets identified with the UIBC tunneling category, the peripheral may issue native (as opposed to generic) peripheral interface commands (e.g., USB, Bluetooth, and PS2 commands, which may comprise a portion of the peripheral data), which the sink device may transfer to the source device using the UIBC. The source device may decapsulate the UIBC-tunneled peripheral data and interpret any decapsulated commands and/or data as if the peripheral were connected directly the host. Similarly, a source device may receive peripheral data, for example from a host interface controller of the source device, and transmit the encapsulated peripheral data to the sink. The sink may decapsulate the peripheral data and may transmit the peripheral data to the peripheral, which is connected to the sink.

In one example, a method comprises establishing a bi-directional user interface back channel (UIBC) to a computing device, receiving encapsulated peripheral data from the computing device using the UIBC, and decapsulating the peripheral data.

In another example, a method comprises establishing a bi-directional user interface back channel (UIBC) to a computing device, receiving peripheral data, encapsulating the peripheral data, and transmitting the encapsulated peripheral data to the computing device using the UIBC.

In another example, a first computing device comprises a user interface back channel (UIBC) module configured to: establish a bi-directional user interface back channel (UIBC) to a second computing device, receive encapsulated peripheral data from the second computing using the UIBC, and decapsulate the peripheral data.

In another example, a first computing device comprises a user interface back channel (UIBC) module configured to: establish a bi-directional user interface back channel (UIBC) to a second computing device, receive peripheral data, encapsulate the peripheral data, and transmit the encapsulated peripheral data to the second computing device using the UIBC.

In another example, a first computing device comprises means for establishing a bi-directional user interface back channel (UIBC) to a second computing device, means for receiving encapsulated peripheral data from the second computing device using the UIBC, and means for decapsulating the peripheral data.

In another example, a first computing device comprises means for establishing a bi-directional user interface back channel (UIBC) to a second computing device, means for receiving peripheral data, means for encapsulating the peripheral data, and means for transmitting the encapsulated peripheral data to the second computing device using the UIBC.

In another example, a computer-readable storage medium comprises instructions stored thereon that when executed in a source device cause one or more processors to establish a bi-directional user interface back channel (UIBC) to a computing device, receive encapsulated peripheral data from the computing device using the UIBC, and decapsulate the peripheral data.

In another example, a computer-readable storage medium comprises instructions stored thereon that when executed in a sink device cause one or more processors to establish a bi-directional user interface back channel (UIBC) to a computing device, receive peripheral data, encapsulate the peripheral data, and transmit the encapsulated peripheral data to the computing device using the UIBC.

The details of one or more examples of the disclosure are set forth in the accompanying drawings and the description below. Other features, objects, and advantages will be apparent from the description and drawings, and from the claims.

DETAILED DESCRIPTION

Figure 1A:
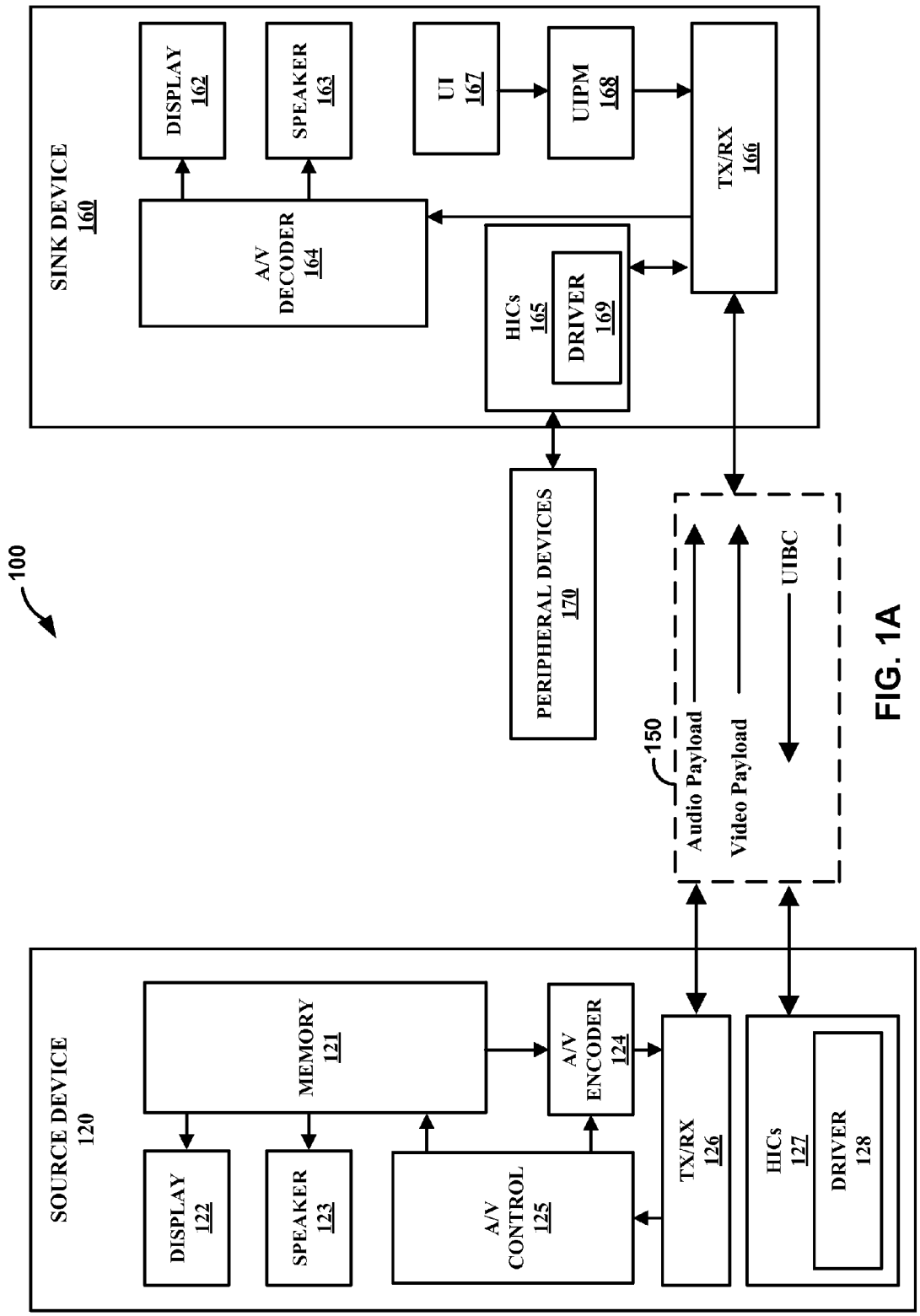
FIG. 1A is a block diagram illustrating an exemplary Wireless Display (WD) source/sink system 100 that may implement bi-directional tunneling of peripheral data in accordance with the techniques of this disclosure.

This disclosure generally relates a system where a source device can communicate with a sink device. The source device and the sink device may support wireless communication. As part of a communication session, a source device can transmit audio and video data to the sink device, and the sink device can transmit user inputs received at the sink device back to the wireless source device. In this manner, a user of the sink device can control the source device and control the content that is being transmitted from the source device to the sink device.

According to techniques of this disclosure, a user with a computing device, such as a cell phone, can walk into an environment, such as an office, and in that environment use a sink device with an array of connected peripheral devices that utilize the cellphone as his or her main processing engine. As one example, a user may have files stored on a cell phone and may want to edit those files prior to transmitting them via email. The user may, however, prefer to perform such tasks on a desktop computer with a larger display and full sized keyboard. In addition to the keyboard, the desktop may have a group of associated peripheral devices including user interface devices, storage devices, a printer, and other such peripheral devices. According to the techniques of this disclosure, a user can utilize a desktop computer to run applications on the cell phone. In this manner, the user can be presented with the user experience of operating on a desktop computer, while the majority of processing is occurring at the cell phone. In such an operating environment, for the user to have a user experience truly reminiscent of a desktop experience while the majority of processing is occurring on the phone, the phone may need to be able to interface with the peripheral devices of the desktop computer.

Techniques of this disclosure extend a User Input Back Channel (UIBC) to be bidirectional by adding a new input category, referred to as a "tunneling" category, to enable bi-directional communication over the UIBC, which may also be referred to as a user input channel (UIC). Accordingly, the techniques of this disclosure may in some instances give a user the convenience of being able to access their data, as well as an array of sink peripheral devices of multiple sink devices. As will be apparent, the specific example given above with a phone and a desktop is merely one of many examples of devices and environments in which the techniques of this disclosure may be used.

Using the UIC, a sink device can transmit and receive data of peripherals connected to the sink device between the source device and the peripherals connected to the sink device in an agnostic manner. The source device can have drivers of the peripherals associated with the sink device installed so as to enable processing of the data received from the peripherals. In some configurations, the sink device may also have peripheral drivers installed but with limited capability. The sink device may interface with the peripheral devices and encapsulate and forward the data for the peripherals according to techniques described in this disclosure. The source device and sink devices may utilize Real-Time Streaming Protocol (RTSP)-based control procedures to negotiate and agree on utilizing the tunneling to support bidirectional tunneling of peripheral data of a particular peripheral interface technology. A source device and a sink device can also exchange tunneling context information to identify each sink device and the peripherals connected to each sink device. The source device and sink device may encapsulate UIC peripheral and send the data over a TCP/IP connection. The source device and sink device may transmit a UIC-specific header that includes the tunneling context information when transmitting the encapsulated peripheral data. The common header can identify the data as peripheral data, and the header may further include information that identifies a particular peripheral, as well as a particular sink device.

FIG. 1A is a block diagram illustrating an exemplary Wireless Display (WD) source/sink system 100 that may implement bi-directional tunneling of peripheral data in accordance with the techniques of this disclosure. As shown in FIG. 1A, system 100 includes source device 120 that communicates with sink device 160 via communication channel 150. Source device 120 may include a memory 121 that stores audio/video (A/V) data, display 122, speaker 123, audio/video encoder 124 (also referred to as encoder 124), audio/video control module 125, transmitter/receiver (TX/RX) unit 126, host interface controllers 127 (HICs 127), and driver 128. Sink device 160 may include display 162, speaker 163, audio/video decoder 164 (also referred to as decoder 164), host interface controllers 165 (HICs 165), transmitter/receiver unit 166, user input (UI) device 167, user input processing module (UIPM) 168, and driver 169. Sink device 160 may also be connected to one or more peripheral devices 170. The illustrated components constitute merely one example configuration for source/sink system 100. Other configurations may include fewer components than those illustrated or may include additional components than those illustrated.

In the example of FIG. 1A, source device 120 can display the video portion of audio/video data on display 122 and can output the audio portion of the audio/video data on speaker 123. The Audio/video data may be stored locally on memory 121, accessed from an external storage medium such as a file server, Blu-ray disc, or DVD, or may be streamed to source device 120 via a network connection such as the internet. In some instances, the audio/video data may be captured in real-time via a camera and microphone of source device 120. The Audio/video data may include multimedia content such as movies, television shows, or music, but may also include real-time content generated by source device 120. Such real-time content may for example be produced by applications running on source device 120. As will be described in more detail, such real-time content may in some instances include, in some examples, a video frame of user input options available for a user to select. In some instances, audio/video data may include video frames that are a combination of different types of content, such as a video frame of a movie or TV program that has user input options overlaid on the frame of video.

In addition to rendering audio/video data locally via display 122 and speaker 123, audio/video encoder 124 of source device 120 can encode audio/video data, and transmitter/receiver unit 126 can transmit the encoded data over communication channel 150 to sink device 160. Transmitter/receiver unit 166 of sink device 160 receives the encoded data, and audio/video decoder 164 decodes the encoded data and outputs the decoded data via display 162 and speaker 163. In this manner, the audio and video data being rendered by display 122 and speaker 123 can be simultaneously rendered by display 162 and speaker 163. The audio data and video data may be arranged in frames, and the audio frames may be time-synchronized with the video frames when rendered.

Audio/video encoder 124 and audio/video decoder 164 may implement any number of audio and video compression standards, such as the ITU-T H.264 standard, alternatively referred to as MPEG-4, Part 10, Advanced Video Coding (AVC), or the newly emerging high efficiency video coding (HEVC) standard, sometimes called the H.265 standard. Generally speaking, audio/video decoder 164 is configured to perform the reciprocal coding operations of audio/video encoder 124. Although not shown in FIG. 1A, in some aspects, A/V encoder 124 and A/V decoder 164 may each be integrated with an audio encoder and decoder, and may include appropriate MUX-DEMUX units, or other hardware and software, to handle encoding of both audio and video in a common data stream or separate data streams.

As will be described in more detail below, A/V encoder 124 may also perform other encoding functions in addition to implementing a video compression standard as described above. For example, A/V encoder 124 may add various types of metadata to A/V data prior to A/V data being transmitted to sink device 160. In some instances, A/V data may be stored on or received at source device 120 in an encoded form and thus not require further compression by A/V encoder 124.

Although, FIG. 1A shows communication channel 150 carrying audio payload data and video payload data separately, it is to be understood that in some instances video payload data and audio payload data may be part of a common data stream. If applicable, MUX-DEMUX units may conform to the ITU H.223 multiplexer protocol, or other protocols such as the user datagram protocol (UDP). Audio/video encoder 124 and audio/video decoder 164 each may be implemented as one or more microprocessors, digital signal processors (DSPs), application specific integrated circuits (ASICs), field programmable gate arrays (FPGAs), discrete logic, software, hardware, firmware or any combinations thereof. Each of audio/video encoder 124 and audio/video decoder 164 may be included in one or more encoders or decoders, either of which may be integrated as part of a combined encoder/decoder (CODEC).

Display 122 and display 162 may comprise any of a variety of video output devices such as a cathode ray tube (CRT), a liquid crystal display (LCD), a plasma display, an organic light emitting diode (OLED) display, or another type of display device. Speaker 123 may comprise any of a variety of audio output devices such as headphones, a single-speaker system, a multi-speaker system, or a surround sound system. Additionally, although display 122 and speaker 123 are shown as part of source device 120 and display 162 and speaker 163 are shown as part of sink device 160, source device 120 and sink device 160 may in fact be a system of devices. As one example, display 162 may be a television, speaker 163 may be a surround sound system, and decoder 164 may be part of an external box connected, either wired or wirelessly, to display 162 and speaker 163. In other instances, sink device 160 may be a single device, such as a tablet computer or smartphone. In still other cases, source device 160 and sink device 120 are similar devices, e.g., both being smartphones, tablet computers, or the like. In this case, one device may operate as the source and the other may operate as the sink. These rolls may even be reversed in subsequent communication sessions.

Speaker 123 and speaker 163 may comprise any of a variety of audio output devices such as headphones, a single-speaker system, a multi-speaker system, or a surround sound system. Additionally, although display 122 and speaker 163 are shown as part of source device 120 and display 162 and speaker 163 are shown as part of sink device 160, source device 120 and sink device 160 may in fact be a system of devices. As one example, display 162 may be a television, speaker 163 may be a surround sound system, and A/V decoder 164 may be part of an external box connected, either wired or wirelessly, to display 162 and speaker 163.

In other instances, sink device 160 may be a single device, such as a tablet computer or smartphone. In still other cases, source device 120 and sink device 160 may be similar devices, e.g., both being smartphones, tablet computers, or the like. In this case, one device may operate as the source device and the other may operate as the sink device. These roles may be reversed in subsequent communication sessions. In still other cases, the source device 120 may comprise a mobile device, such as a smartphone, laptop or tablet computer, and the sink device 160 may comprise a more stationary device (e.g., with an AC power cord), in which case the source device 120 may deliver audio and video data for presentation to one or more viewers via the sink device 160.

Source device 120 and sink device 160 may include host interface controllers 127, and 164, respectively. Host interface controllers 127 and 165 may comprise one or more interface controllers that allow source device 120 and sink device 160 to communicate with peripheral devices 170 over various interfaces, e.g., USB, BLUETOOTH, Secure Digital Input Output (SDIO), Serial AT Attachment (SATA), FIREWIRE devices, external Serial ATA (ESATA) devices, or any other type of peripheral devices that may be connected to a computing device. In some yet more specific examples, peripheral devices 170 may include devices such as digital cameras, wireless docks, secure digital card readers, external hard drives, and/or flash drives.

Drivers 128 and 169 may control host interface controllers 127 and 165, respectively. Drivers 128 and 169 may each comprise software, hardware, firmware, or any other technology that may be used to control host interface controllers 127 and 165. In some examples, driver 128 may be a driver that is capable of supporting devices connected using some or all of the interfaces of peripheral devices 170. Driver 169 may comprise a "lighter-weight" driver as compared to driver 128, which may only include a subset of the functionality of driver 128. As an example, driver 169 may include the capability to enumerate one or more interfaces of each of peripheral devices 170 and to encapsulate and decapsulate UIC data. However, driver 169 may lack the capability to interpret interface-specific packets, or to select a particular interface of one of peripheral devices 170. In this manner, driver 169 and host interface controllers 165 may perform less processing of peripheral data as compared to driver 128 and host interface controllers 127. The reduced processing may in turn enable sink device 160 to consume less power and/or to use simpler hardware to communicate with peripheral devices 170. The simpler hardware and/or reduced processing of sink device 160 may reduce the power consumption of sink device 160 in some cases.

Transmitter/receiver unit 126 and transmitter/receiver unit 166 may each include various mixers, filters, amplifiers and other components designed for signal modulation, as well as one or more antennas and other components designed for transmitting and receiving data. Communication channel 150 generally represents any suitable communication medium, or collection of different communication media, for transmitting video data from source device 120 to sink device 160. Communication channel 150 is usually a relatively short-range communication channel, and may implement a physical channel structure similar to Wi-Fi, Bluetooth, or the like, such as implementing defined 2.4, GHz, 3.6 GHz, 5 GHz, 60 GHz or Ultrawideband (UWB) frequency band structures. However, communication channel 150 is not necessarily limited in this respect, and may comprise any wireless or wired communication medium, such as a radio frequency (RF) spectrum or one or more physical transmission lines, or any combination of wireless and wired media. In other examples, communication channel 150 may even form part of a packet-based network, such as a wired or wireless local area network, a wide-area network, or a global network such as the Internet. Additionally, communication channel 150 may be used by source device 120 and sink device 160 to create a peer-to-peer link.

Source device 120 and sink device 160 may establish a communication session according to a capability negotiation using, for example, Real-Time Streaming Protocol (RTSP) control messages. In one example, a request to establish a communication session may be sent by the source device 120 to the sink device 160. Once the media share session is established, source device 120 transmits media data, e.g., audio video (AV) data, to the participating sink device 160 using the Real-time Transport protocol (RTP). Sink device 160 renders the received media data on its display and audio equipment (not shown in FIG. 1A).

Source device 120 and sink device 160 may then communicate over communication channel 150 using a communications protocol such as a standard from the IEEE 802.11 family of standards. In one example communication channel 150 may be a network communication channel. In this example, a communication service provider may centrally operate and administer one or more networks using a base station as a network hub. Source device 120 and sink device 160 may, for example, communicate according to the Wi-Fi Direct or Wi-Fi Display (WFD) standards, such that source device 120 and sink device 160 communicate directly with one another without the use of an intermediary such as wireless access points or so called hotspots. Source device 120 and sink device 160 may also establish a tunneled direct link setup (TDLS) to avoid or reduce network congestion. WFD and TDLS are intended to setup relatively short-distance communication sessions. Relatively short distance in this context may refer to, for example, less than approximately 70 meters, although in a noisy or obstructed environment the distance between devices may be even shorter, such as less than approximately 35 meters, or less than approximately 20 meters.

The techniques of this disclosure may at times be described with respect to WFD, but it is contemplated that aspects of these techniques may also be compatible with other communication protocols. By way of example and not limitation, the wireless communication between source device 120 and sink device may utilize orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

In addition to decoding and rendering data received from source device 120, sink device 160 can also receive user inputs from user input device 167. User input device 167 may, for example, be a keyboard, mouse, trackball or track pad, touch screen, voice command recognition module, or any other such user input device. UIPM 172 formats user input commands received by user input device 170 into a data packet structure that source device 120 is capable of processing. Such data packets are transmitted by transmitter/receiver 166 to source device 120 over communication channel 150. Transmitter/receiver unit 126 receives the data packets, and A/V control module 130 parses the data packets to interpret the user input command that was received by user input device 167. Based on the command received in the data packet, A/V control module 125 may change the content being encoded and transmitted. In this manner, a user of sink device 160 can control the audio payload data and video payload data being transmitted by source device 120 remotely and without directly interacting with source device 120.

Additionally, users of sink device 160 may be able to launch and control applications on source device 120. For example, a user of sink device 160 may able to launch a photo editing application stored on source device 120 and use the application to edit a photo that is stored locally on source device 120. Sink device 160 may present a user with a user experience that looks and feels like the photo is being edited locally on sink device 160 while in fact the photo is being edited on source device 120. Using such a configuration, a device user may be able to leverage the capabilities of one device for use with several devices. For example, source device 120 may be a smartphone with a large amount of memory and high-end processing capabilities, and a user of source device 120 may use the smartphone in all the settings and situations smartphones are typically used. When watching a movie, the user may wish to watch the movie on a device with a bigger display screen, in which case sink device 160 may be a tablet computer. When wanting to send or respond to email, the user may wish to use a device with a physical keyboard, in which case sink device 160 may be a laptop. In both instances, the bulk of the processing may still be performed by source device 120 even though the user is interacting with sink device 160. The source device 120 and the sink device 160 may facilitate two way interactions by transmitting control data, such as, data used to negotiate and/or identify the capabilities of the devices in any given session over communications channel 150.

In some configuration, A/V control module 125 may be an operating system process being executed by the operating system of source device 125. In other configurations, however, A/V control module 125 may be a software process of an application running on source device 120. In such a configuration, the user input command may be interpreted by the software process, such that a user of sink device 160 is interacting directly with the application running on source device 120, as opposed to the operating system running on source device 120. By interacting directly with an application as opposed to an operating system, a user of sink device 160 may have access to a library of commands that are not native to the operating system of source device 120. Additionally, interacting directly with an application may enable commands to be more easily transmitted and processed by devices running on different platforms.

Source device 120 can respond to user inputs applied at wireless sink device 160. In such an interactive application setting, the user inputs applied at wireless sink device 160 may be sent back to the wireless display source over communication channel 150. In one example, a reverse channel architecture, also referred to as a UIBC may be implemented to enable sink device 160 to transmit the user inputs applied at sink device 160 to source device 120. The reverse channel architecture may include upper layer messages for transporting user inputs and lower layer frames for negotiating user interface capabilities at sink device 160 and source device 120. The UIBC may reside over the Internet Protocol (IP) transport layer between sink device 160 and source device 120. In this manner, the UIBC may be above the transport layer in the Open System Interconnection (OSI) communication model. In one example, the OSI communication includes seven layers (1—physical, 2—data link, 3—network, 4—transport, 5—session, 6—presentation, and 7—application). In this example, being above transport layer refers to layers 5, 6, and 7. To promote reliable transmission and in sequence delivery of data packets containing user input data, UIBC may be configured run on top of other packet-based communication protocols such as TCIP/IP or UDP. UDP and TCP may operate in parallel in the OSI layer architecture. TCP/IP may enable sink device 160 and source device 120 to implement retransmission techniques in the event of packet loss.

The techniques of this disclosure relate generally to extending UIBC, which is defined in the WFD standard as a unidirectional communication channel for transmitting input data and data of input devices associated with a sink device, e.g. sink device 160. The techniques of this disclosure extend UIBC to include support a bi-directional communications channel for transmitting peripheral data from sink peripherals, e.g., peripheral devices 170, connected to sink device 160, via communication channel 150 to source device 120. Similarly, source device 120 may transmit peripheral data to peripheral devices 170 via communication channel 150. More specifically, communication channel 150 may be extended to support "tunneling." In the context of the present disclosure, tunneling may refer to encapsulating peripheral data within the data connection of the UIBC.

In accordance with the techniques of this disclosure, source device 120 or sink device 160 may be configured to establish a bi-directional user interface back channel (UIBC) to a first device, receive encapsulated peripheral data from the first device using the UIBC, and decapsulating the peripheral data. Source device 120 or sink device 160 may also include a UIBC module that is configured to establish a bi-directional UIBC to a first device, receive peripheral data, encapsulate the peripheral data, and transmit the peripheral data to the first device using the UIBC in accordance with the techniques of this disclosure. Source device 120 or sink device 160 may also include a UIBC module that is configured to establish a bi-directional user interface back channel (UIBC) to a second computing device, receive peripheral data, encapsulate the peripheral data, and transmit the peripheral data to the second computing device using the UIBC.

In addition to being extended to support bidirectional transmission of encapsulated peripheral data, the UIBC may be designed to transport various types of user input data, including cross-platform user input data. For example, source device 120 may run the iOS® operating system, while sink device 160 runs another operating system such as Android® or Windows®. Regardless of platform, UIPM 168 can encapsulate received user input in a form understandable to A/V control module 125. A number of different types of user input formats may be supported by the UIBC so as to allow many different types of source and sink devices to exploit the protocol. Generic input formats may be defined, and platform specific input formats may both be supported, thus providing flexibility in the manner in which user input can be communicated between source device 120 and sink device 160 by the UIBC.

In the example of FIG. 1A, source device 120 may comprise a smartphone, tablet computer, laptop computer, desktop computer, WIFI enabled television, or any other device capable of transmitting audio and video data. Sink device 160 may likewise comprise a smartphone, tablet computer, laptop computer, desktop computer, WIFI enabled television, or any other device capable of receiving audio and video data and receiving user input data. In some instances, sink device 160 may include a system of devices, such that display 162, speaker 163, UI device 167, and A/V encoder 164 all parts of separate but interoperative devices. Source device 120 may likewise be a system of devices rather than a single device.

For this disclosure, the term source device is generally used to refer to the device that is transmitting audio/video data, and the term sink device is generally used to refer to the device that is receiving the audio/video data from the source device. In many cases, source device 120 and sink device 160 may be similar or identical devices, with one device operating as the source and the other operating as the sink. Moreover, these rolls may be reversed in different communication sessions.

Thus, a sink device in one communication session may be a source device in a subsequent communication session, or vice versa. Both source device 120 and sink device 160 may both devices that support wireless communication over communication channel 150.

Figure 1B:
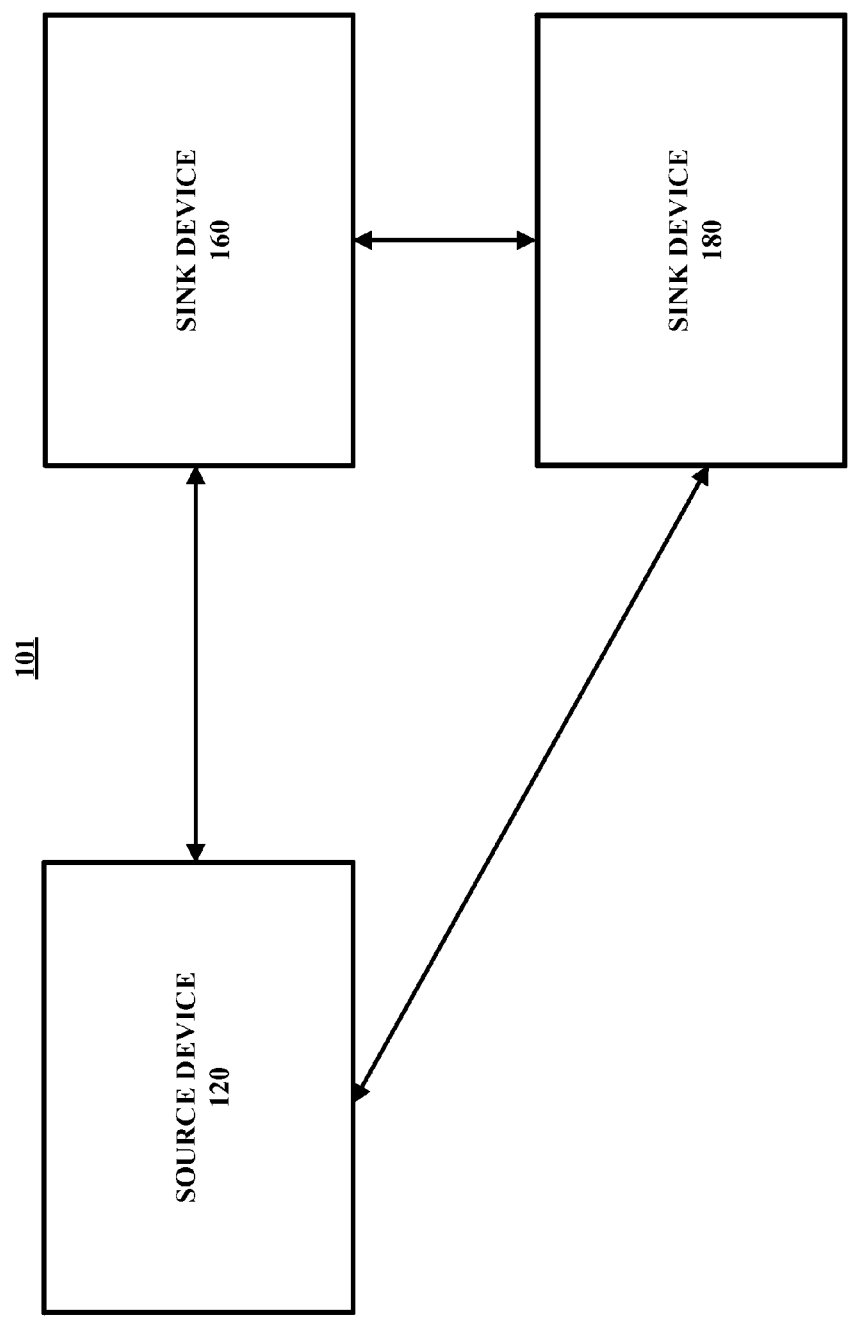
FIG. 1B is a block diagram illustrating an exemplary source/sink system 101 that may implement bi-directional tunneling of peripheral data in accordance with the techniques of this disclosure.

FIG. 1B is a block diagram illustrating an exemplary source/sink system 101 that may implement bi-directional tunneling of peripheral data in accordance with the techniques of this disclosure. Source/sink system 101 includes source device 120 and sink device 160, each of which may function and operate in the manner described above for FIG. 1A. Source/sink system 101 further includes sink device 180. In a similar manner to sink device 160 described above, sink device 180 may receive audio and video data from source device 120. Sink device 160 and source device 120 may transmit and receive encapsulated peripheral data over an established UIC.

In some configurations, sink device 160 and sink device 180 may operate independently of one another, and audio and video data output at source device 120 may be simultaneously output at sink device 160 and sink device 180. In alternate configurations, sink device 160 may be a primary sink device and sink device 180 may be a secondary sink device. In such an example configuration, sink device 160 and sink device 180 may be coupled, and sink device 160 may display video data while sink device 180 outputs corresponding audio data.

Figure 2:
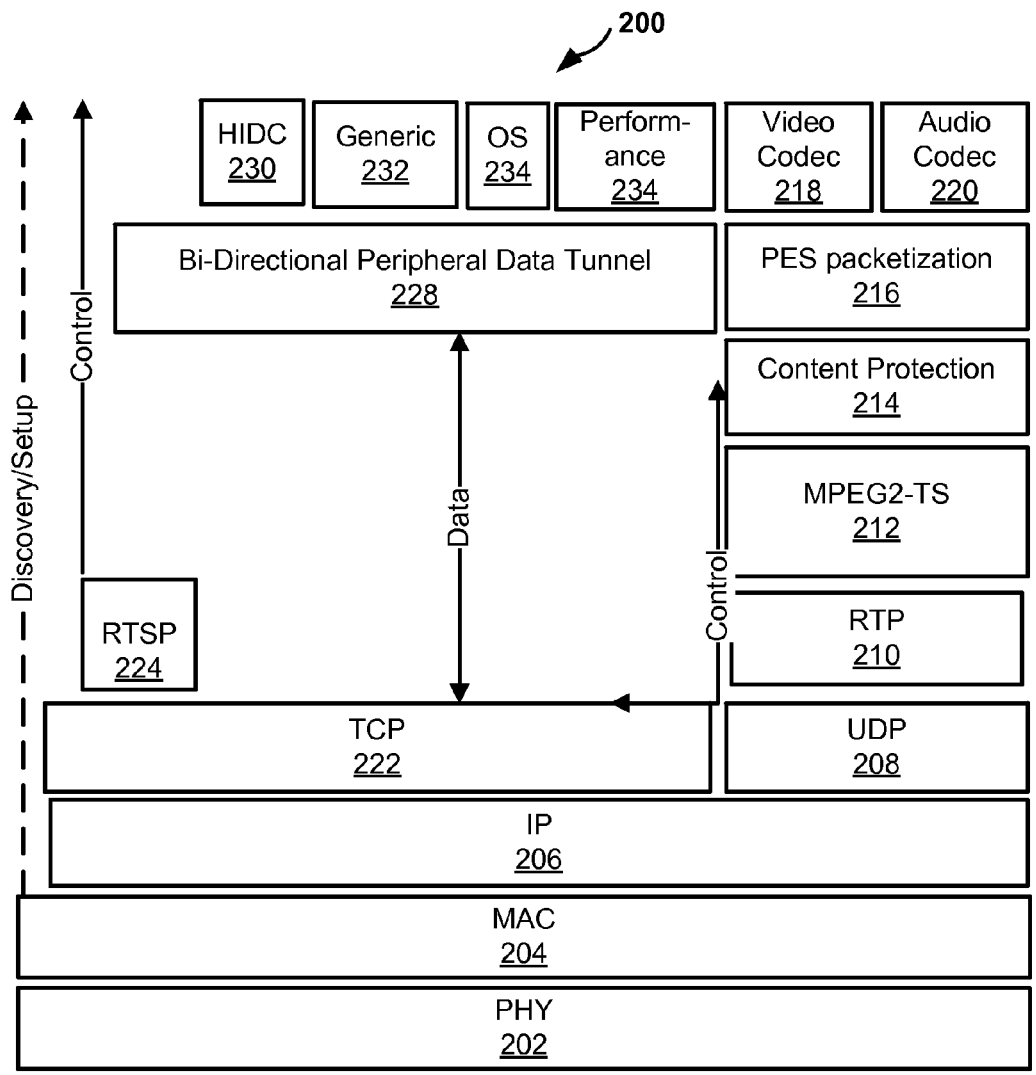
FIG. 2 is a block diagram illustrating an example of a data communication model or protocol stack for a WD system.

FIG. 2 is a block diagram illustrating an example of a data communication model or protocol stack for a WD system. Data communication model 200 illustrates the interactions between data and control protocols used for transmitting data between a source device and a sink device in an implemented WD system. In one example WD system 100 may use data communications model 200. Data communication model 200 includes physical (PHY) layer 202, media access control (MAC) layer (204), internet protocol (IP) 206, user datagram protocol (UDP) 208, real time protocol (RTP) 210, MPEG2 transport stream (MPEG2-TS) 212, content protection 214, packetized elementary stream (PES) packetization 216, video codec 218, audio codec 220, transport control protocol (TCP) 222, real time streaming protocol (RTSP) 224, bi-directional peripheral data tunnel 228, human interface device constants 230, generic user inputs 232, and performance analysis 234.

Physical layer 202 and MAC layer 204 may define physical signaling, addressing and channel access control used for communications in a WD system. Physical layer 202 and MAC layer 204 may define the frequency band structure used for communication, e.g., Federal Communications Commission bands defined at 2.4, GHz, 3.6 GHz, 5 GHz, 60 GHz or Ultrawideband (UWB) frequency band structures. Physical layer 202 and MAC 204 may also define data modulation techniques e.g. analog and digital amplitude modulation, frequency modulation, phase modulation techniques, and combinations thereof. Physical layer 202 and MAC 204 may also define multiplexing techniques, e.g. example, time division multi access (TDMA), frequency division multi access (FDMA), code division multi access (CDMA), or any combination of OFDM, FDMA, TDMA and/or CDMA. In one example, physical layer 202 and media access control layer 204 may be defined by a Wi-Fi (e.g., IEEE 802.11-2007 and 802.11n-2009x) standard, such as that provided by WFD. In other examples, physical layer 202 and media access control layer 204 may be defined by any of: WirelessHD, Wireless Home Digital Interface (WHDI), WiGig, and Wireless USB.

Internet protocol (IP) 206, user datagram protocol (UDP) 208, real time protocol (RTP) 210, transport control protocol (TCP) 222, and real time streaming protocol (RTSP) 224 define packet structures and encapsulations used in a WD system and may be defined according to the standards maintained by the Internet Engineering Task Force (IETF).

RTSP 224 may be used by source device 120 and sink device 160 to negotiate capabilities, establish a session, and session maintenance and management. Source device 120 and sink device 160 may establish a bidirectional peripheral data tunnel 228 using an RTSP message transaction to negotiate a capability of source device 120 and sink device 160 to support tunneling over the UIBC. The use of RTSP negotiation to establish bidirectional peripheral data tunnel 228 may be similar to using the RTSP negotiation process to establish a media share session and/or the UIBC.

For example, source device 120 may send a capability request message (e.g., RTSP GET_PARAMETER request message) to sink device 160 specifying a list of capabilities that are of interest to source device 120. In accordance with the techniques of this disclosure, the capability request message may include the capability to support bidirectional tunneling of encapsulated peripheral data over the UIBC. Sink device 160 may respond with a capability response message (e.g., RTSP GET_PARAMETER response message) to source device 120 declaring its capability of supporting the bidirectional peripheral data tunnel. As an example, the capability response message may indicate a "yes" if sink device 160 supports bidirectional tunneling of peripheral data over the UIBC. Source device 120 may then send an acknowledgement request message (e.g., RTSP SET_PARAMETER request message) to sink device 160 indicating that the tunnel will be used to encapsulate peripheral data. Sink device 160 may respond with an acknowledgment response message (e.g., RTSP SET_PARAMETER response message) to source device 120 acknowledging that the feedback channel will be used during the media share session. Once source device 120 and sink device 160 have agreed to utilize the UIC, Video codec 218 may define the video data coding techniques that may be used by a WD system. Video codec 218 may implement any number of video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), VP8 and High-Efficiency Video Coding (HEVC). It should be noted that in some instances WD system may either compressed or uncompressed video data.

Audio codec 220 may define the audio data coding techniques that may be used by a WD system. Audio data may be coded using multi-channel formats such those developed by Dolby and Digital Theater Systems. Audio data may be coded using a compressed or uncompressed format. Examples of compressed audio formats include MPEG-1, 2 Audio Layers II and III, AC-3, AAC. An example of an uncompressed audio format includes pulse-code modulation (PCM) audio format.

Packetized elementary stream (PES) packetization 216 and MPEG2 transport stream (MPEG2-TS) 212 may define how coded audio and video data is packetized and transmitted. Packetized elementary stream (PES) packetization 216 and MPEG-TS 212 may be defined according to MPEG-2 Part 1. In other examples, audio and video data may be packetized and transmitted according to other packetization and transport stream protocols. Content protection 214, may provide protection against unauthorized copying of audio or video data. In one example, content protection 214 may be defined according to High bandwidth Digital Content Protection 2.0 specification. Bi-Directional Peripheral data tunnel 228 may define how peripheral data and is encapsulated and transmitted.

Figure 3:
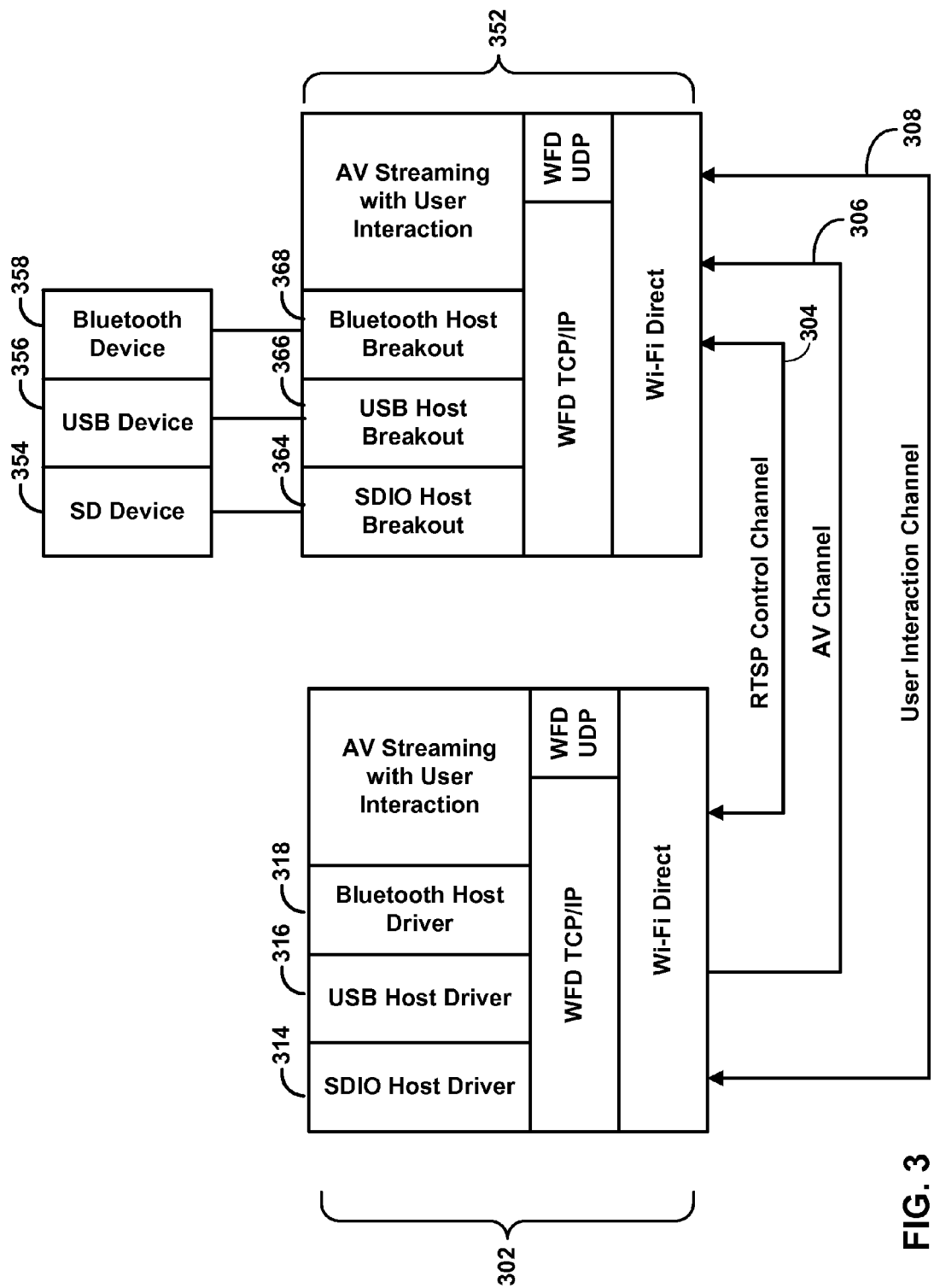
FIG. 3 is a conceptual diagram illustrating various components of a WFD system that supports bidirectional peripheral data tunneling in accordance with the techniques of this disclosure.

FIG. 3 is a conceptual diagram illustrating various components of a WFD system that supports bidirectional peripheral data tunneling in accordance with the techniques of this disclosure. The example of FIG. 3 includes source device 302 and sink device 352. Source device 302 and sink device 302 may be connected via three channels: an RTSP control channel 304, an audio-visual (AV) channel 306, and a user interaction channel 308. The user interaction channel may comprise a UIBC channel, which may further support bidirectional tunneling of peripheral data. Source device 302 and sink device 352 may send and receive audio and video data over AV channel 306, and may engage in capabilities negotiation over RTSP channel 304.

In the example of FIG. 3, sink device 352 may include peripherals include SD device 354, USB device 356, and BLUETOOTH device 358, which may be connected to respective host controllers comprising SDIO host breakout 364, USB host breakout 366, and BLUETOOTH host breakout 358. Sink device 302 may include a number of host drivers, such as SDIO host driver 314, USB host driver 316, and Bluetooth host driver 318. Each of SDIO host driver 314, USB host driver 316, and Bluetooth host driver 318 may also communicate or control a respective a host interface controller for a corresponding interface.

SDIO host driver 314, USB host driver 316, Bluetooth host driver 318, SDIO host breakout 364, USB host breakout 366, and Bluetooth host breakout 368 may send or receive encapsulated peripheral data in accordance with the techniques of this disclosure over user interaction channel 308. More specifically, source device 302 or and sink device 352 may transmit or receive the encapsulated peripheral data using TCP/IP and/or or UDP. In some examples driver SDIO host breakout 365, USB host breakout 366, and Bluetooth host breakout, as well as other host breakouts (not shown in this example) may enumerate the interfaces of SD device 354, USB device 356, and Bluetooth device 358 before establishing a UIBC connection over user interaction channel 308.

In another example, source device 302 may receive encapsulated WFD data, decapsulate the data, and forward the decapsulated peripheral data to appropriate host drivers, such as SDIO host driver 314, USB host driver, 316, and/or BLUETOOTH host driver 318 ("host drivers 314, 316, 318"). Source device 302 may reply with additional peripheral data or commands from one or more of host drivers 314, 316, 318. Source device 302 may further transmit the data and/or commands to sink device 352 via user interface channel 308.

Figure 4:
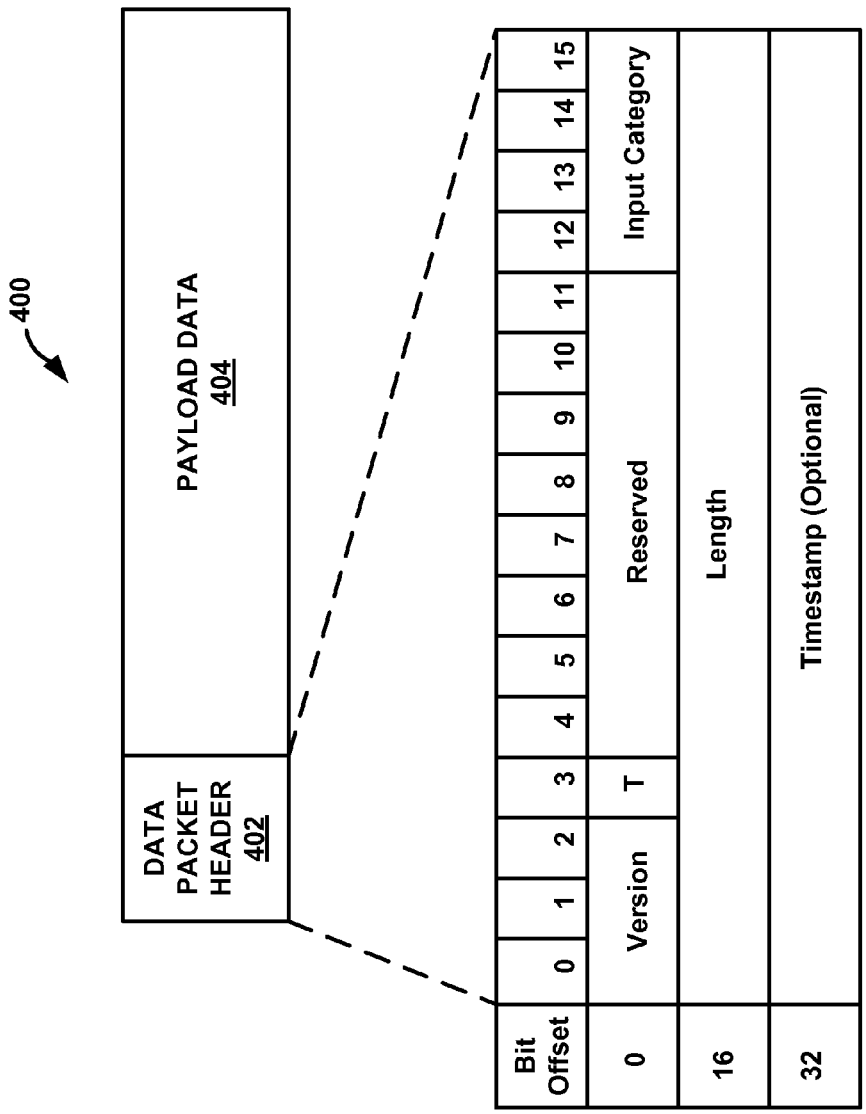
FIG. 4 is a conceptual diagram illustrating an example of a Bi-directional tunneling packet 400, which may be used to transmit encapsulated peripheral data between a sink device and a source device.

FIG. 4 is a conceptual diagram illustrating an example of a Bi-directional tunneling packet 400, which may be used to transmit encapsulated peripheral data between a sink device and a source device. An example of data packet header 402 is illustrated in FIG. 4. The numbers 0-15 identify bit locations within data packet header 402, and the numbers 0, 16 and 32 identify the bit offset between separate fields in data packet header 402. Data packet header 402 includes a version field, a timestamp flag ("T"), a reserved field, an input category field, a length field, and an optional timestamp field. In the example of FIG. 4, the version field is a 3-bit field that may indicate the version of a particular communications protocol being implemented by a sink device. The value in the version field may inform a source device how to parse the remainder of data packet header 402 as well as how to parse payload data 404. The timestamp flag is a 1-bit field that indicates whether or not the optional timestamp field is present in data packet header 402. The timestamp flag may, for example, include a "1" to indicate that the timestamp field is present, and may include a "0" to indicate that the timestamp field is not present. The reserved field is an 8-bit field reserved for use by future versions of a particular protocol identified in the version field.

In the example of FIG. 4, the input category field is a 4-bit field to identify an input category for payload data 404 contained in Bi-directional tunneling packet 400. The value of the input category field identifies to a source device the type of data included in payload data 404 and how payload data 404 is formatted. Based on this formatting, a source device determines how to parse payload data 404. The structure of payload data 404 is discussed in further detail below with respect to FIG. 5.

As one example, the input category field may identify a generic input category to indicate that payload data 404 is formatted using generic information elements defined in a protocol being executed by both a source device and sink device. As another example, the input category field may identify a human interface device command (HIDC) input category to indicate that payload data 404 is formatted based on the type of user interface through which the input data is received at a sink device. As another example, the input category field may identify an operating system (OS) specific input category to indicate that payload data 404 is formatted based on the type OS used by either the source device or the sink device. According to the techniques of this disclosure, the input category field may also identify a tunneling input category to indicate that payload data 404 includes encapsulated peripheral data, for example, from source device 120 or sink device 160 of FIG. 1. The tunneling input category differentiates the payload data in the packet from generic user input and HIDC user input. In the case of generic or HIDC user input, the effect of the user input on the subsequent media data sent to a sink device typically relates to how the media data is presented to the user at sink device, e.g., zoom and pan operations.

The timestamp field may comprise an optional 16-bit field that, when present, may contain a timestamp associated with media data generated by a source device and transmitted to a sink device. For example, source device 120 may have applied a timestamp to a media data packet prior to transmitting the media data packet to sink device 160. When present, the timestamp field in data packet header 402 may include the timestamp that identifies the latest media data packet received at sink device 160 prior to sink device 160 transmitting a Bi-directional tunneling packet 400 to a source device. In other examples, the timestamp field may include the timestamp that identifies a different media data packet received at sink device 160. Timestamp values may enable source device 120 to identify which media data packet experienced reported performance degradation and to calculate the roundtrip delay in a WFD system.

The length field may comprise a 16-bit field to indicate the length of a Bi-directional tunneling packet 400. Based on the value of the length field, source device 120 may identify the end of a UIBC packet and the beginning of a new, subsequent packet. The number and sizes of the fields in feedback packet 400 illustrated in FIG. 4 are merely explanatory. In other examples, a UIBC packet may include fields having larger or smaller sizes than in Bi-directional tunneling packet 400 illustrated in FIG. 4, and/or may include more or fewer fields than Bi-directional tunneling packet 400 illustrated in FIG. 4.

Bi-directional tunneling packet 400 may be transmitted from sink device 160 to source device 120 (FIG. 1A) or from source device 120 to sink device 160 via the UIC in accordance with the techniques of this disclosure. In this manner, the bi-directional peripheral data tunnel may extend the capabilities of the UIBC reverse channel architecture implemented between sink device 160 and source device 120. To piggyback on the UIBC, a new input category called "tunneling" may be utilized with the UIBC data packet header defined in WFD to indicate that the payload data of the UIBC packet includes encapsulated peripheral data.

Driver 128 and driver 169 may be responsible for encapsulating and decapsulating peripheral data to and from bi-directional tunneling packet 400. Driver 128 and driver 169 may also examine payload data 404 of data packet header 402 of bi-directional tunneling packet 400 to verify the format of bi-directional tunneling packet 400, to determine the source or destination of the packet, as well as to determine which peripheral device of e.g., of peripheral devices 170, that bi-directional tunneling packet 400 is associated.

In an example where source device 120 or sink device 160 receives encapsulated peripheral data, driver 128 or driver 169 may decapsulate payload data 404 and construct an interface-specific packet based on payload data 404. An interface-specific packet may comprise a packet such as a USB packet, or another data unit that host interface controllers 127 and 165 may utilize to communicate over a particular interface. Host interface controllers 127 or 165 may further parse or process the interface-specific packet that driver 128 or driver 169 constructs. As an example, host interface controllers 165 may transmit the interface-specific packet to peripheral devices 170.

To construct the interface-specific packet from a packet with the format of bi-directional tunneling packet 400, driver 128 or driver 169 may remove data packet header 402 from bi-directional tunneling packet 400, leaving only payload data 400. Driver 128 or 169 may also add an interface-specific header, such as a USB packet header, to payload data 404. In an example where driver 128 or driver 169 receives encapsulated peripheral data in the form of bi-directional tunneling packet 400, driver 128 or 169 may determine that payload data 404 of bi-directional tunneling packet 400 comprises a portion of an interface-specific packet. Driver 128 or 169 may combine the payloads of multiple packets that have the format of bi-directional tunneling packet 400 to form a single interface-specific packet. In another example, driver 128 or 169 may receive peripheral data and may construct a packet with the format of Bi-directional tunneling packet 400 based on the interface-specific packet. To construct the bi-directional tunneling packet, driver 128 may remove any interface-specific packet headers from the interface-specific packet, and add a header with the format of data packet header 402.

Driver 128 or 169 may also construct multiple packets with the format of Bi-directional tunneling packet 400 based on a single interface-specific packet. Driver 128 or 169 may divide the payload of the interface-specific packet into multiple smaller pieces and may use the smaller pieces as the payload data of each of the multiple bi-directional tunneling packets. Driver 128 or 169 may divide an interface-specific packet into multiple bi-directional tunneling packets, for example, if the payload of the interface-specific packet is too large to fit in the payload data 404 of Bi-directional tunneling packet 400. In some examples, drier 128 or 169 may also include data for multiple different sink peripherals of the same sink device in payload data 404.

In some examples, data packet data 404 may include information that indicates a particular peripheral device and a particular sink device. The information that indicates the sink device may be referred to as a "reverse tunneling identifier," and the information that indicates the particular peripheral device may be referred to as a "forwarding tunnel identifier." When sink device 160 receives encapsulated peripheral data, sink device 160 may examine the forward tunneling identifier of payload data 4040 to determine to which peripheral device of peripheral devices 170 to forward payload data 304. When source device 120 receives encapsulated peripheral data with the format of Bi-directional tunneling packet 400, source device 120 may examine the reverse tunneling identifier included in data packet header 402 to determine which particular sink device transmitted that packet, in a case where there is more than one sink device.

Figure 5:
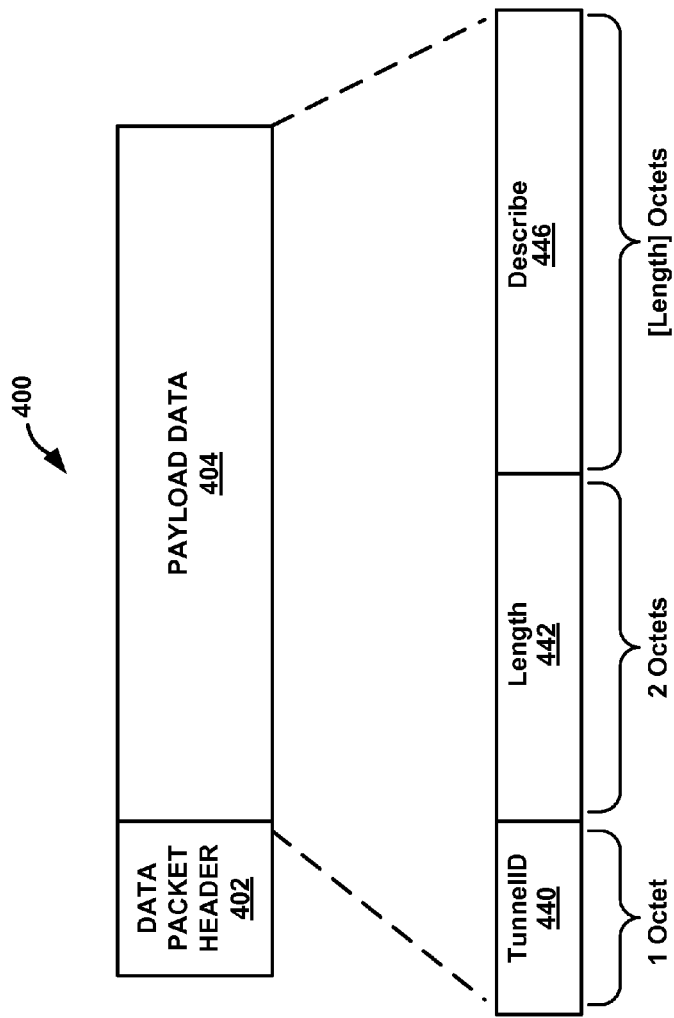
FIG. 5 is a conceptual diagram illustrating the payload data of a bi-directional tunneling packet in accordance with the techniques of this disclosure.

FIG. 5 is a conceptual diagram illustrating the payload data of a bi-directional tunneling packet in accordance with the techniques of this disclosure. FIG. 5 illustrates bi-directional tunneling packet 400, which includes data packet header 402, and payload data 404. The payload data 404 of a bi-directional tunneling packet may have a format that is particular to bi-directional tunneling packets, and is distinguishable from UIBC packets with different input category values, e.g., packets having generic, and HIDC input category values. In particular, payload data 404 of bi-directional tunneling packet 400 may include tunnelID field 440, length field 442, and describe field 446.

The value of the TunnelID field 440, which is one octet in size, may indicate either a value of a forward tunneling identifier or a reverse tunneling identifier. Whether the value of the tunnelID field indicates a forward or reverse tunneling identifier depends on whether a source device sends bi-directional tunneling packet 400 to a sink device, or vice versa. If the source device sends bi-directional tunneling packet 400 to the sink device, the value of the tunnelID comprises a reverse tunneling identifier that indicates to which peripheral the sink device should send the data encapsulated in describe field 446. If a sink device sends bi-directional tunneling packet 400 to the source device, the value of tunnelID field 440 indicates a forward tunneling identifier that indicates which sink device and peripheral of that sink device sent the data encapsulated in describe field 446.

In either the case of the source sending Bi-directional tunneling packet 400 to the sink, or vice versa, length field 442, which is two octets in size, indicates the size (in octets) of describe field 442, which includes peripheral data, and follows length field 442. In some examples, a source device or sink device may include multiple sets of the tunnelID, length, and describe fields if there is enough room in payload data to include multiple sets of the three fields. As one example, a source device may include multiple sets of tunnelID, length, and describe fields, and each set may correspond to data for a different peripheral of the same sink device. Including multiple sets of the tunnelID, length, and describe fields in payload data 404 may avoid the overhead of having to transmit additional UIBC packets for each peripheral device of the sink device.

Figure 6:
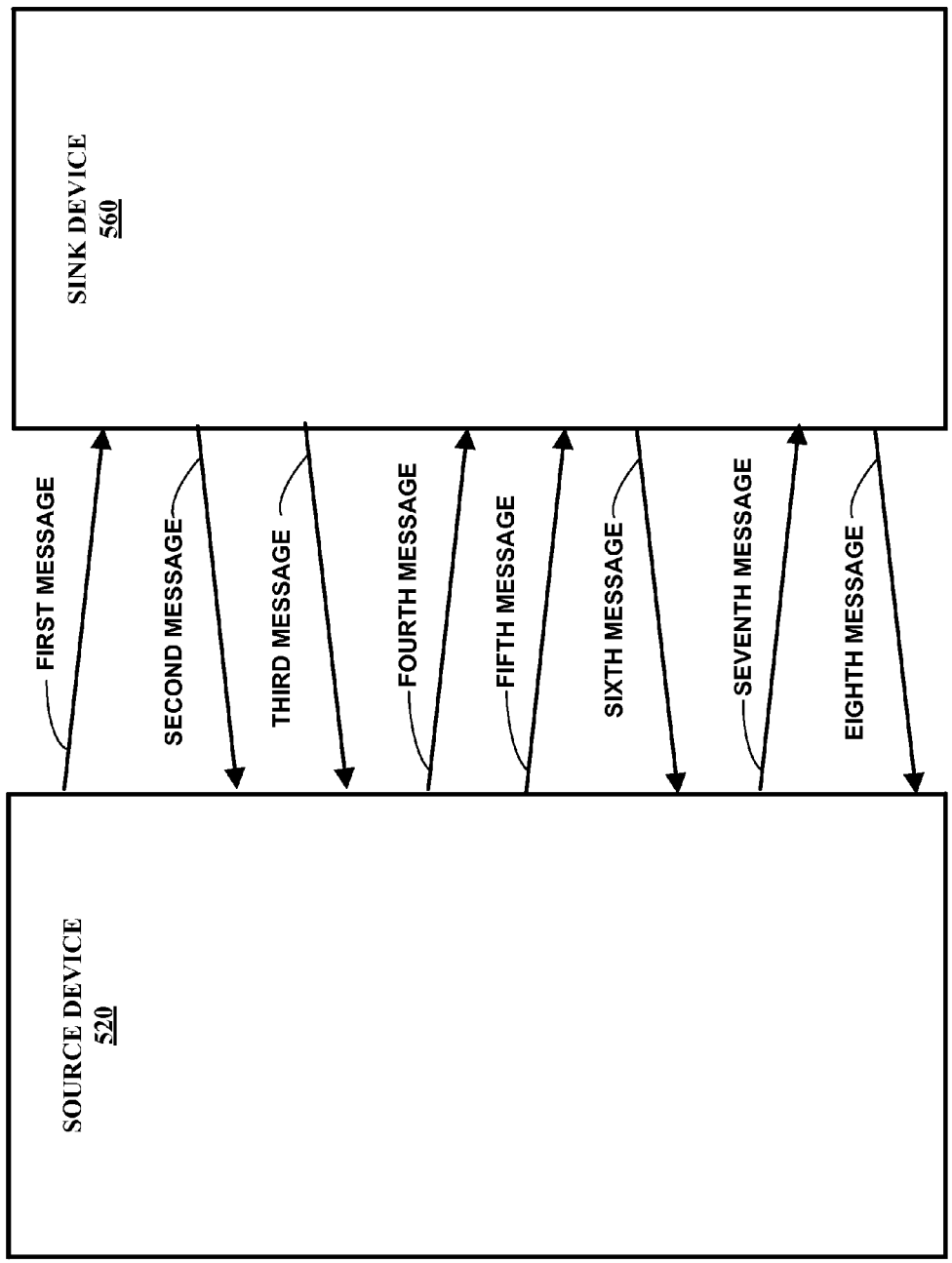
FIG. 6 is a block diagram illustrating an example message transfer sequence between a source device 520 and a sink device 560 as part of a capabilities negotiations session.

FIG. 6 is a block diagram illustrating an example message transfer sequence between a source device 520 and a sink device 560 as part of a capabilities negotiations session. Source device 520 may generally operate in the same manner described above for source device 120 of FIG. 1A, and sink device 560 may generally operate in the same manner described above for sink device 160 of FIG. 1A. After source device 520 and sink device 560 establish connectivity, source device 520 and sink device 560 may determine the set of parameters to be used for their subsequent communication session as part of a capability negotiation exchange. In some examples, source device 520 and sink device 560 may negotiate upon whether or not to use bi-directional tunneling of peripheral data in accordance with the techniques of this disclosure.

Source device 520 and sink device 560 may negotiate capabilities by utilizing a sequence of messages. The messages may, for example, be RTSP messages. Each RTSP message may include a body, which may further comprise plaintext character strings. At any stage of the negotiations, the recipient of an RTSP request message may respond with an RTSP response that includes an RTSP status code other than RTSP OK, in which case, the message exchange might be retried with a different set of parameters or the capability negotiation session may be ended.

Source device 520 can send a first message (RTSP OPTIONS request message) to sink device 560 in order to determine the set of RTSP methods that sink device 560 supports. On receipt of the first message from source device 520, sink device 560 can respond with a second message (RTSP OPTIONS response message) that lists the RTSP methods supported by sink 560. The second message may also include a RTSP OK status code.

After sending the second message to source device 520, sink device 560 can send a third message (RTSP OPTIONS request message) in order to determine the set of RTSP methods that source device 520 supports. On receipt of the third message from sink device 560, source device 520 can respond with a fourth message (RTSP OPTIONS response message) that lists the RTSP methods supported by source device 520. The fourth message can also include RTSP OK status code.

After sending the fourth message, source device 520 can send a fifth message (RTSP GET_PARAMETER request message) to specify a list of capabilities that are of interest to source device 520. Sink device 560 can respond with a sixth message (an RTSP GET_PARAMETER response message). The sixth message may contain an RTSP status code. If the RTSP status code is OK, then the sixth message can also include response parameters to the parameter specified in the fifth message that are supported by sink device 560. Sink device 560 can ignore parameters in the fifth message that sink device 560 does not support.

Based on the sixth message, source 520 can determine the optimal set of parameters to be used for the communication session and can send a seventh message (an RTSP SET_PARAMETER request message) to sink device 560. The seventh message can contain the parameter set to be used during the communication session between source device 520 and sink device 560. The seventh message can include the wfd-presentation-url that describes the Universal Resource Identifier (URI) to be used in the RTSP Setup request in order to setup the communication session. The wfd-presentation-url specifies the URI that sink device 560 can use for later messages during a session establishment exchange. The wfd-url0 and wfd-url1 values specified in this parameter can correspond to the values of rtp-port0 and rtp-port1 values in the wfd-client-rtp-ports in the seventh message. Upon receipt of the seventh message, sink device 560 can respond with an eighth message with an RTSP status code indicating if setting the parameters as specified in the seventh message was successful.

Figure 7:
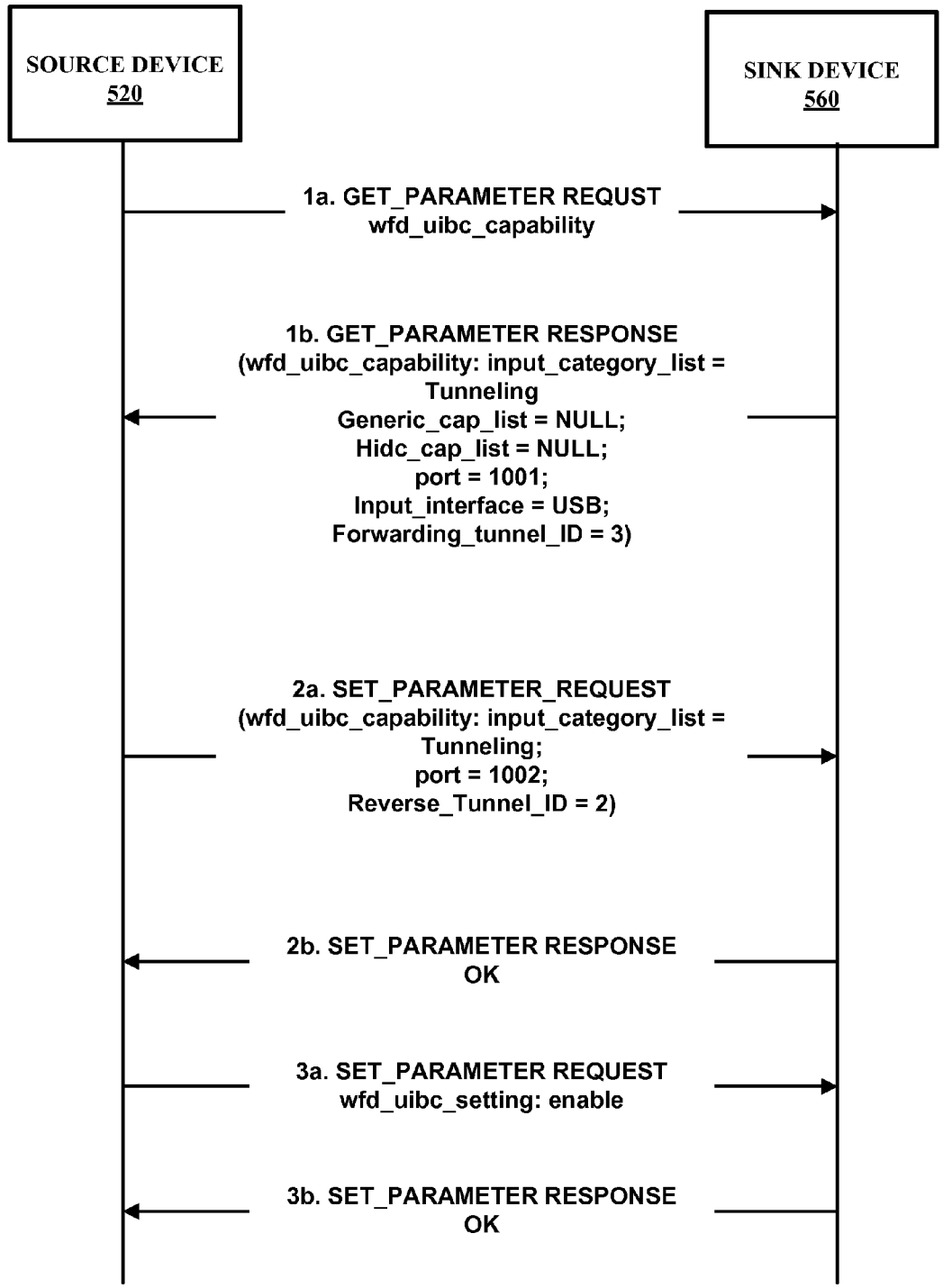
FIG. 7 is a conceptual diagram illustrating an example Real Time Streaming Protocol (RTSP) message transfer sequences between a source device 520 and a sink device 560 for performing capability negotiations according to techniques of this disclosure.

FIG. 7 is a conceptual diagram illustrating an example Real Time Streaming Protocol (RTSP) message transfer sequences between a source device 520 and a sink device 560 for performing capability negotiations according to techniques of this disclosure. The RTSP messages sent between source device 520 and sink device 560 are comprised of a header and a plaintext body. The format of the body is not strictly defined, and may be modified to include additional textual data in accordance with the techniques of this disclosure. The text inside the parentheses inside each of the RTSP message of FIG. 7 represents an example body of each message.

The examples of FIG. 7 illustrate how the RTSP capabilities negotiations may be extended in order to support bi-directional communication and tunneling over UIBC. The message transfer sequence of FIG. 7 is intended provide a more detailed view of the transfer sequence described above for FIG. 6. In the example of FIG. 7 however, the message sequence illustrates a typical UIBC negotiations sequence. However, FIG. 7 may also be described such that bi-directional tunneling capabilities are supported according to the techniques of this disclosure.

To begin the UIBC capabilities negotiation, source device 520 transmits a GET_PARAMETER request 1a. Responsive to receiving GET_PARAMETER request 1a, sink device 560 transmits GET_PARAMETER response 1b to source device 520. GET_PARAMETER response 1b identifies a list of input categories that sink device 560 supports. Previously, UIBC supported two general categories, "generic," and "HIDC" (Human Interface Device Class). In order to support bi-directional (i.e., UIC) communication, the GET_PARAMETER response 1b may be extended to include an additional "tunneling" category, which is illustrated with respect to GET_PARAMETER response 1b in FIG. 7. The inclusion of the tunneling category in the GET_PARAMETER response message may indicate to source device 520 that sink device 560 supports bidirectional tunneling of peripheral data of a particular peripheral of sink device 560. For each of the supported input categories, GET_PARAMETER response 1b may also include an associated list of supported capabilities for that input type (e.g., "generic_cap_list" for generic input types, and "hidc_cap_list," for HIDC input types). GET_PARAMETER response 1b may also include a port field, which indicates a TCP/IP port number. Sink device 560 may receive encapsulated peripheral data from source device 520 at the TCP/IP port number indicated by the value of the port field.

In order to support bidirectional tunneling, the GET_PARAMETER response message 1b may also be extended to include an input interface field, which may also be referred to as "input_interface" field. The additional input_interface field is also illustrated above with respect to GET_PARAMETER response 1b. The input interface field may include an interface value. The interface value may indicate a particular peripheral interface associated with a peripheral device of sink device 560. As examples, the values of the input interface field may include one of SDIO, USB, BLUETOOTH, or other peripheral interfaces.

To support bidirectional tunneling, GET_PARAMETER response message 1b, may also be extended to include a forwarding tunnel identifier field, which may also be referred to as a "forwarding_tunnel_ID." The forwarding tunnel identifier may comprise an additional textual key value pair (along with the input category, and input interface) that comprises part of the body of an RTSP GET_PARAMETER response message that is transmitted during UIBC capabilities negotiation. In the example of FIG. 7, the syntax of the new forwarding tunnel identifier of the RTSP message may be "forwarding_tunnel_ID=#", where "#" is the value of the forwarding tunnel assigned to a particular peripheral device of a sink device.

The forwarding tunnel identifier field may identify a particular peripheral device or an interface of a peripheral device that is connected to a sink device (e.g., sink 560). As an example, a BLUETOOH peripheral of sink device 560 may have an identifier of "1," while a USB peripheral, such a mouse, may have an identifier of "3." The forwarding tunnel identifier allows a sink device receiving encapsulated peripheral data from a source device using the UIC to identify which peripheral the received UIC peripheral data should be forwarded to if sink 560 has more than one connected peripheral.

In some examples, one peripheral may include multiple endpoints with which sink device 560 and source device 520 may communicate. The endpoints of a device may represent one or more different logical data connections between sink device 560 and the connected peripheral device. For instance, a USB peripheral may include a bulk endpoint, as well as an isochronous endpoint. The bulk endpoint may have certain data transfer characteristics, while the isochronous endpoint may have a different set of data transfer characteristics. In the example where a sink peripheral device has multiple endpoints, sink device 560 may communicate information about the multiple endpoints of the peripheral in GET_PARAMETER response 1b. Sink device 560 may transmit a list of multiple port values, and each port field may correspond to a particular endpoint of the sink peripheral. Sink device 560 may also transmit a list of multiple forwarding tunnel identifiers. Each forwarding tunnel identifier may correspond to a particular endpoint of sink device 560.

Host interface controllers 165 and driver 169 (FIG. 1A) of sink device 560 may enumerate the endpoints of each of each connected peripheral device. Sink device 560 may enumerate the endpoints of the connected peripheral devices such that GET_PARAMETER response 1b includes a listing of each of the one endpoints of each of a particular peripheral device connected to sink device 560. GET_PARAMETER RESPONSE 1b may also include additional context information which may identify a type (e.g., isochronous, bulk, etc.) for each of the endpoints.

In FIG. 7, message 2a, "SET_PARAMETER REQUEST" is an example of a second message of an RTSP UIBC capabilities negotiation. Similar to message 1b, message 2a includes a list of supported input categories (e.g., tunneling), and related device information for UIBC devices, which sink device 560 supports. As with message 1b, to support the encapsulation of bidirectional peripheral data, message 2a may extend the input_category_list field to include a "tunneling" input category. Each of the supported input categories of the second list of supported input categories may have an associated list of supported capabilities (e.g., generic_cap_list and hidc_cap_list). As with message 1b, Message 2a also includes a port field. The value of the port field indicates a particular port over which source device 520 may receive encapsulated peripheral data for a particular sink peripheral device or endpoint. In the example illustrated in FIG. 7, the value of the port field, is 1002, which may indicate that source device 520 supports receiving encapsulated peripheral data for a peripheral device of sink device 560 on TCP/IP port 1002.

Message 2a also identifies input categories and input types supported by source device 520, but it may not be a comprehensive list of all input categories and input types supported by source device 520. Instead, message 2a, "SET_PARAMETER REQUEST" may identify only those input categories and input types identified in message 1b, "GET_PARAMETER RESPONSE," as being supported by sink device 560. In this manner, the input categories and input types identified in message 2a, SET_PARAMETER REQUEST, may constitute a subset of the input categories and input types identified in message 1b. In the example illustrated in FIG. 7, message 2a also includes the tunneling input category in the input category list. The inclusion of the tunneling input category indicates to sink device 560 that source device 520 also supports bi-directional tunneling of encapsulated peripheral data.

In addition to the fields shown in SET_PARAMETER REQUEST 2a, source device 520 may respond to the GET_PARAMETER RESPONSE 1b with a reverse tunnel identifier, which may also be referred to as a "reverse_tunnel_id." The reverse tunnel identifier may be similar to the forwarding tunnel identifier. The reverse tunnel identifier may be used to support bidirectional peripheral data encapsulation and may identify a particular sink device, such as sink device 560, to source device 520. In the example of FIG. 7, message device 520 includes a reverse tunnel identifier with a value of "2." Each sink device, (e.g., sink device 560) may include the reverse tunneling identifier in any UIC packets transmitted to source device 520 in order to identify that particular sink device as the sender of those UIC packets. When source device 520 is communicating with more than one sink device, source device 520 may utilize the value of reverse tunnel identifier to identify UIC packets from each of the multiple sink devices.

If sink device 560 agrees with the UIC parameters that source device 520 transmits in message 2a, sink device 560 may transmit a SET_PARAMETER RESPONSE message 2b. Responsive to receiving SET_PARAMETER RESPONSE message 2b, source device 520 may transmit SET_PARAMETER REQUEST message 3a, which confirms that the UIBC will be enabled with the parameters negotiated previously in messages 1a, 1b, and 2a. Responsive to receiving SET_PARAMETER REQUEST message 3a, sink device 560 may transmit SET_PARAMETER RESPONSE message 3b. SET_PARAMETER RESPONSE 3b may acknowledge to source device 520 that sink device 560 is ready to engage in communications over the UIC.

Once source device 520 and sink device 560 have agreed upon a set of UIC parameters, source device 520 and sink device 560 may transmit data over the UIC. Because sink device 560 and source device 520 have both agreed to a UIC tunnel, both devices know that the UIC connection will be bidirectional as opposed to unidirectional. Source device 520 and 560 may send the UIC data over the port(s) agreed to during the RTSP capabilities negotiation. Each UIC packet may include a reverse tunnel identifier, which may indicate a particular sink device, or a forwarding tunnel identifier, which may identify a particular peripheral or peripheral interface connected to sink device 560.

Source device 520 may engage in RTSP communications and UIC capabilities negotiations as illustrated in FIG. 7 more than once. As an example, source device 520 may engage in RTSP UIC capabilities negotiations once for each peripheral device connected of each sink device with which source device 520 is communicating. The multiple capabilities negotiations may be used to assign different forwarding tunnel identifiers to each peripheral device, and to assign reverse tunneling identifiers to each sink device of the multiple sink devices with which source device 520 may communicate.

Figure 8:
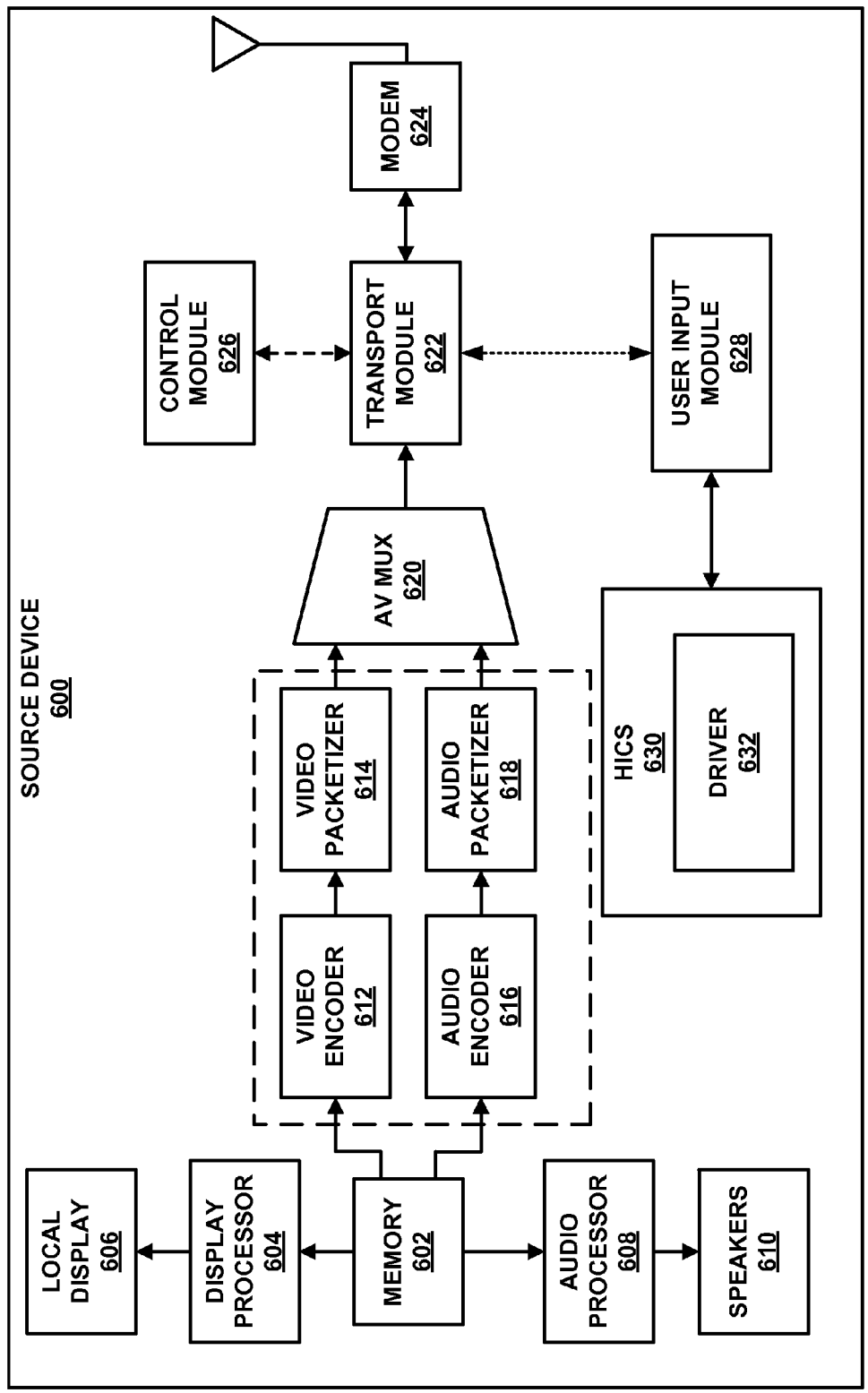
FIG. 8 is a block diagram illustrating an example of a source device that may implement bidirectional tunneling of encapsulated peripheral data in accordance with the techniques of this disclosure

FIG. 8 is a block diagram illustrating an example of a source device that may implement bidirectional tunneling of encapsulated peripheral data in accordance with the techniques of this disclosure. Source device 600 may be part of a WD system that incorporates the data communication model provided in FIG. 2. Source device 600 may be configured to encode and/or decode media data for transport, storage, and/or display. Source device 600 includes memory 602, display processor 604, local display 606, audio processor 608, speakers 610, video encoder 612, video packetizer 614, audio encoder 616, audio packetizer 618, A/V mux 620, transport module 622, modem 624, control module 626, feedback depacketizer 628, and feedback module 630. The components of source device 600 may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof.

Memory 602 may store A/V visual data in the form of media data in compressed or uncompressed formats. Memory 602 may store an entire media data file, or may comprise a smaller buffer that simply stores a portion of a media data file, e.g., streamed from another device or source. Memory 602 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like. Memory 602 may comprise a computer-readable storage medium for storing media data, as well as other kinds of data. Memory 602 may additionally store instructions and program code that are executed by a processor as part of performing the various techniques described in this disclosure.

Display processor 604 may obtain captured video frames and may process video data for display on local display 606. Display 606 comprise one of a variety of display devices such as a liquid crystal display (LCD), a plasma display, an organic light emitting diode (OLED) display, or another type of display device capable of presenting video data to a user of source device 600.

Audio processor 608 may obtain audio captured audio samples and may process audio data for output to speakers 610. Speakers 610 may comprise any of a variety of audio output devices such as headphones, a single-speaker system, a multi-speaker system, or a surround sound system.

Video encoder 612 may obtain video data from memory 602 and encode video data to a desired video format. Video encoder 612 may be a combination of hardware and software used to implement aspects of video codec 218 described above with respect to FIG. 2. Video encoder 612 may encode the video according to any number of video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), VP8 and High-Efficiency Video Coding (HEVC). It should be noted that in some cases video encoder 612 may encode video such that video data is compressed using a lossless or lossy compression technique.

Video packetizer 614 may packetize encoded video data. In one example video packetizer 614 may packetize encoded video data as defined according to MPEG-2 Part 1. In other examples, video data may be packetized according to other packetization protocols. Video packetizer 614 may be a combination of hardware and software used to implement aspects of packetized elementary stream (PES) packetization 216 described above with respect to FIG. 2.

Audio encoder 616 may obtain audio data from memory 602 and encode audio data to a desired audio format. Audio encoder 616 may be a combination of hardware and software used to implement aspects of audio codec 220 described above with respect to FIG. 2. Audio data may be coded using multi-channel formats such those developed by Dolby and Digital Theater Systems. Audio data may be coded using a compressed or uncompressed format. Examples of compressed audio formats include MPEG-1, 2 Audio Layers II and III, AC-3, AAC. An example of an uncompressed audio format includes pulse-code modulation (PCM) audio format.

Audio packetizer 618 may packetize encoded audio data. In one example, audio packetizer 618 may packetize encoded audio data as defined according to MPEG-2 Part 1. In other examples, audio data may be packetized according to other packetization protocols. Audio packetizer 618 may be a combination of hardware and software used to implement aspects of packetized elementary stream (PES) packetization 216 described above with respect to FIG. 2.

A/V mux 620 may apply multiplexing techniques to combine video payload data and audio payload data as part of a common data stream. In one example, A/V mux 620 may encapsulate packetized elementary video and audio streams as an MPEG2 transport stream defined according to MPEG-2 Part 1. A/V mux 620 may provide synchronization for audio and video packets, as well as error correction techniques.

Transport module 622 may process media data for transport to a sink device. Further, transport module 622 may process received packets from a sink device so that they may be further processed. For example, transport module 622 may be configured to communicate using IP, TCP, UDP, RTP, and RTSP. For example, transport module 622 may further encapsulate an MPEG2-TS for communication to a sink device or across a network.

Modem 624 may be configured to perform physical and MAC layer processing according to the physical and MAC layers utilized in a WD system. As described with reference to FIG. 2. Physical and MAC layers may define physical signaling, addressing and channel access control used for communications in a WD system. In one example, modem 624 may configured to perform physical layer and MAC layer processing for physical and MAC layers defined by a Wi-Fi (e.g., IEEE 802.11x) standard, such as that provided by WFD. In other examples, modem 624 may configured to perform physical layer and MAC layer processing for any of: WirelessHD, WiMedia, Wireless Home Digital Interface (WHDI), WiGig, and Wireless USB.

Control module 626 may be configured to perform source device 600 communication control functions. Communication control functions may relate to negotiating capabilities with a sink device, establishing a session with a sink device, and session maintenance and management. Control module 626 may use RTSP to communication with a sink device. Further, control module 626 may establish a UIBC using an RTSP message transaction to negotiate a capability of source device 600 and a sink device to support the tunneling input category on the UIBC. In some examples, control module 626 may establish a bi-directional tunnel of encapsulated peripheral data in accordance with the techniques of this disclosure.

User input module 628 may parse human interface device commands (HIDC), generic user inputs, OS specific user inputs, and encapsulated information from a UIBC packet, which may include a tunneling packet. In one example, a user input packet may use the message format described with respect to FIG. 4. In this example, user input de-packetizer 628 may determine how to parse a user input packet based in part on the value of a user input category field in a user input packet header. As one example, a user input category field may identify a generic input category to indicate that feedback packet payload data is formatted using generic information elements. As another example, the user input category field may identify a human interface device command (HIDC) input category. As another example, the user input category field may identify an operating system (OS) specific input category to indicate that payload data is formatted based on the type OS used by either the source device or the sink device.

In another example, user input module 628 may identify encapsulated peripheral data based on the user input category field of a header of the user input packet. If user input module 628 identifies encapsulated peripheral data, driver 632 may decapsulate the peripheral data, in the manner described above with respect to FIG. 4. In some examples, driver 632 may combine the payloads of one or more received user input packets and add an interface-specific header to the combined payloads. Host interface controllers 630 may process the interface specific packets. In some examples, memory 602 may store at least some of the data of the packets such that display processor 604 may perform operations on the data.

Host interface controllers 630 may also construct an interface-specific packet. Driver 632 may split an interface-specific packet into smaller packets, and encapsulate the smaller packets using the UIC in accordance with the techniques of this disclosure. User input module 628 may receive the encapsulated peripheral data from driver 632 and transport module 632 may transmit the encapsulated peripheral using modem 624 over the UIC.

Figure 9:
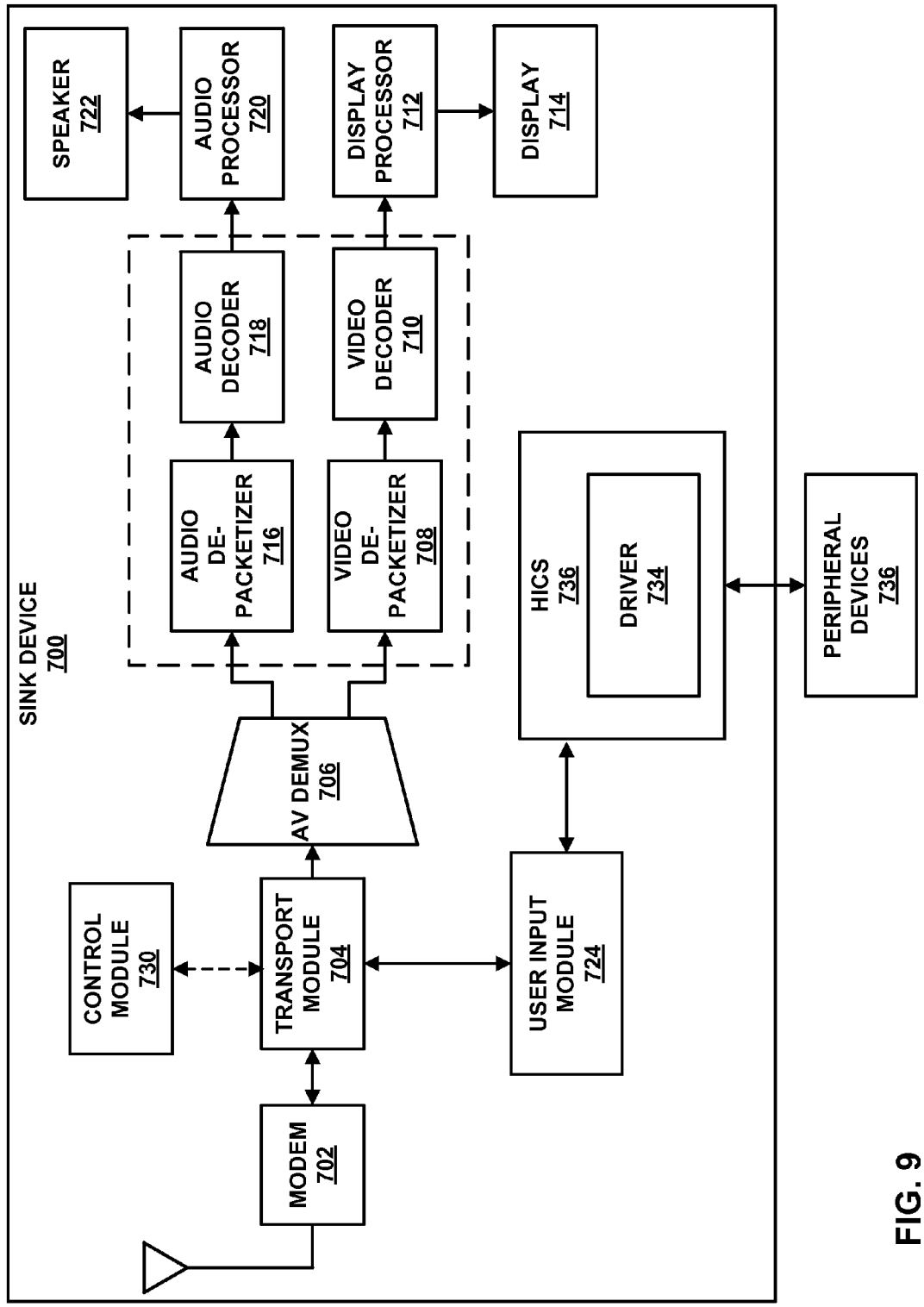
FIG. 9 is a block diagram illustrating an example of a sink device that implements techniques for supporting bi-directional tunneling of peripheral data to and from a source device.

FIG. 9 is a block diagram illustrating an example of a sink device that implements techniques for supporting bi-directional tunneling of peripheral data to and from a source device. Sink device 700 may be part of a WD system that incorporates the data communication model provided in FIG. 2. In one example, Sink device 700 may form a WD system with source device 600. Sink device 700 includes modem 702, transport module 704, A/V demux 706, video de-packetizer 708, video decoder 710, display processor 712, display 714, audio de-packetizer 716, audio decoder 718, audio processor 720, speaker 722, user input module 724, control module 730, driver 734, and host interface controllers 736. The components of sink device 700 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof.

Modem 702, may be configured to perform physical and MAC layer processing according to the physical and MAC layers utilized in a WD system. As described with reference to FIG. 2. Physical and MAC layers may define physical signaling, addressing and channel access control used for communications in a WD system. In one example, modem 702 may configured to perform physical layer and MAC layer processing for physical and MAC layers defined by a Wi-Fi (e.g., IEEE 802.11x) standard, such as that provided by WFD. In other examples, modem 702 may configured to perform physical layer and MAC layer processing for any of: WirelessHD, WiMedia, Wireless Home Digital Interface (WHDI), WiGig, and Wireless USB.

Transport module 704, may process received media data from a source device. Further, transport module 704 may process UIBC packets for transport to a source device. For example, transport module 704 may be configured to communicate using IP, TCP, UDP, RTP, and RTSP. In addition, transport module 704 may include a timestamp value in any combination of IP, TCP, UDP, RTP, and RSTP packets.

A/V demux 706 may apply de-multiplexing techniques to separate video payload data and audio payload data from data stream. In one example, A/V mux 706 may separate packetized elementary video and audio streams of an MPEG2 transport stream defined according to MPEG-2 Part 1.

Video de-packetizer 708 and Video decoder 710 may perform reciprocal processing of a video packetizer and a video encoder implementing packetization and coding techniques described herein and output video output video data to display processor 712.

Display processor 712 may obtain captured video frames and may process video data for display on display 714. Display 714 may comprise one of a variety of display devices such as a liquid crystal display (LCD), a plasma display, an organic light emitting diode (OLED) display, or another type of display.

Audio de-packetizer 716 and audio decoder 718 may perform reciprocal processing of an audio packetizer and audio encoder implementing packetization and coding techniques described herein and output audio data to display processor 720

Audio processor 720 may obtain audio data from audio decoder and may process audio data for output to speakers 722. Speakers 722 may comprise any of a variety of audio output devices such as headphones, a single-speaker system, a multi-speaker system, or a surround sound system.

User input module 724 may format user input commands received by user input device such as, for example, a keyboard, mouse, trackball or track pad, touch screen, voice command recognition module, or any other such user input device. In one example user input module 724 may format user input commands according formats defined according to Human interface device commands (HIDC) 230, generic user inputs 232 OS specific user inputs 234, and bi-directional peripheral data tunnel 228 described above with respect to FIG. 2.

User input module 724 may also identify peripheral data from transport module 724 based on the user input field of header of a user input packet. Driver 734 may decapsulate the peripheral data into one or more interface-specific packets, which host interface controllers may process and transmit to peripheral devices 736. In another example, peripheral devices 736 may transmit peripheral data host interface controllers 736. Driver 734 may control or interact with host interface controllers 736 and may encapsulate the peripheral data into a bi-directional UIC packet. User input module 724 may transmit the bi-directional UIC packet to transport module 704, and transport module 704 may transmit the packet using modem 702.

Control module 730 may be configured to perform communication control functions. Communication control functions may relate to negotiating capabilities with a source device, establishing a session with a source device, and session maintenance and management. Control module 730 may use RTSP to communication with a source device. Further, control module 730 may establish a UIBC, such as a bi-directional UIC that supports encapsulation of peripheral data using an RTSP message transaction to negotiate a capability of sink device 700 and a source device to support the UIBC and tunneling input category on the UIBC. The use of RTSP negotiation to establish a bi-directional UIC may be similar to using the RTSP negotiation process to establish a media share session.

Figure 10:
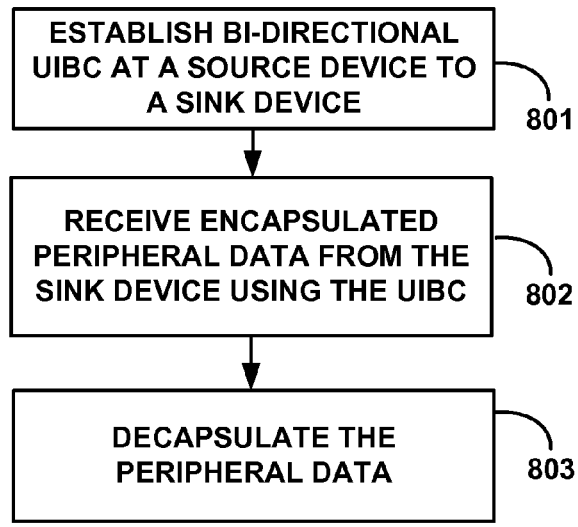
FIG. 10 is a flowchart illustrating a technique for supporting bi-directional tunneling of peripheral data in accordance with the techniques of this disclosure.

FIG. 10 is a flowchart illustrating a technique for supporting bi-directional tunneling of peripheral data in accordance with the techniques of this disclosure. In the technique, a source device may establish a bi-directional user interface back channel (UIBC) to a sink device (801). The source device may receive encapsulated peripheral data from the sink device using the UIBC (802). The source device may then decapsulate the peripheral data (803). In some examples, the source device may transmit the decapsulated peripheral data to a host interface controller of the source device (e.g., one of host interface controllers 165 and 127 of FIG. 1A). The source device may also receive a tunnel identifier value that identifies a peripheral device of the sink device to the source device. In some examples, the peripheral data may be encapsulated in a UIBC packet. In some examples, the source device may also receive a tunnel identifier value that identifies a peripheral device of the sink device to the source device.

Figure 11:
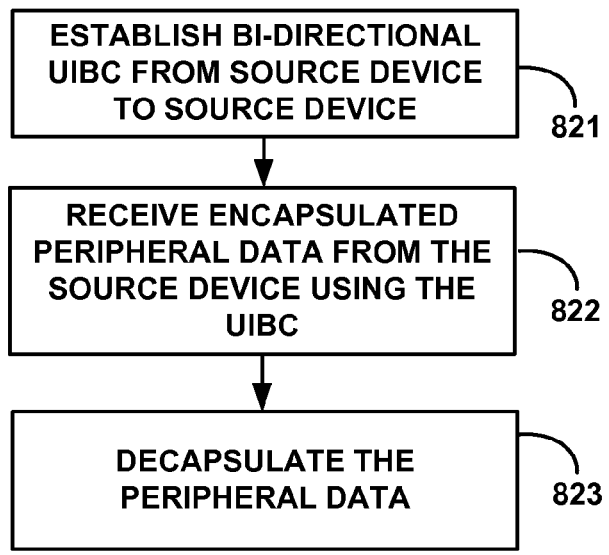
FIG. 11 is a flowchart illustrating a technique for supporting bi-directional tunneling of peripheral data.

FIG. 11 is a flowchart illustrating a technique for supporting bi-directional tunneling of peripheral data in accordance with the techniques of this disclosure. In the technique, a sink device may establish a bi-directional user interface back channel (UIBC) to a source device (821). The sink device may receive encapsulated peripheral data from the source device using the UIBC (822). The sink device may then decapsulate the peripheral data (823). In some examples, the sink device may transmit the decapsulated peripheral data to a peripheral device (e.g., one of peripheral devices 170 of FIG. 1A). In some examples, the sink device may also enumerate an interface of a peripheral device that is connected to the sink device before establishing the bi-directional UIBC to the first device. In some examples, the sink device may receive a tunnel identifier value from the source device that identifies a peripheral device of the sink device.

The encapsulated peripheral data may be formatted according any message format described herein and include any type of information described herein. For example, a peripheral data may be formatted according to message format described with respect to FIG. 4.

Figure 12:
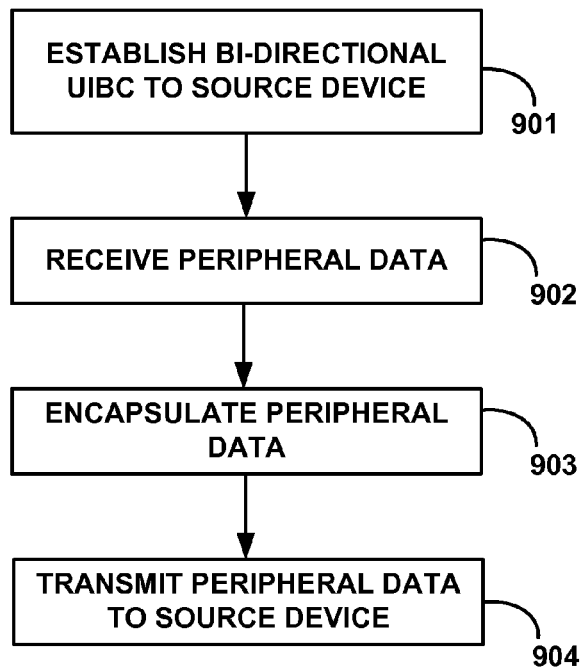
FIG. 12 is a flowchart illustrating a technique for supporting bi-directional tunneling of peripheral data.

FIG. 12 is a flowchart illustrating a technique for supporting bi-directional tunneling of peripheral data. A sink device may establish a bi-directional user interface back channel (UIBC) to a source device (901). The sink device may receive peripheral data (902) and encapsulate the peripheral data (903). The sink device may also transmit the encapsulated peripheral data to the source device using the UIBC (904). In some examples, the sink device may receive the peripheral data from a peripheral device of the sink device (e.g., one of peripheral devices 170 of FIG. 1A). In an example, the sink device may enumerate an interface of a peripheral device that is connected to the sink device before establishing the bi-directional UIBC to the source device. In some examples, the sink device may transmit to the source device a tunnel identifier value that identifies a peripheral device of the sink device.

Figure 13:
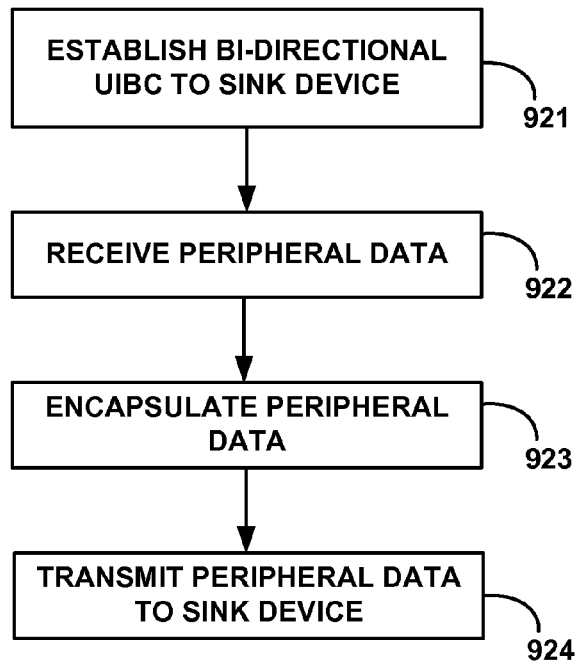
FIG. 13 is a flowchart illustrating a technique for supporting bi-directional tunneling of peripheral data.

FIG. 13 is a flowchart illustrating a technique for supporting bi-directional tunneling of peripheral data. A source device may establish a bi-directional user interface back channel (UIBC) to a sink device (921). The source device may receive peripheral data (922) and encapsulate the peripheral data (923). The source device may also transmit the encapsulated peripheral data to the sink device using the UIBC (924). In some examples, the source device may receive the peripheral data from a host interface controller (e.g., one of host interface controllers 165 and 127 of FIG. 1A). In some examples, the source device may transmit to the sink device a tunnel identifier value that identifies a peripheral device of the sink device.

The encapsulated peripheral data may be formatted according any message format described herein and include any type of information described herein. For example, a peripheral data may be formatted according to message format described with respect to FIG. 4.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:
1. A method comprising:
   establishing a bi-directional user interface back channel (UIBC) to a computing device;
   receiving a tunnel identifier value associated with the UIBC that identifies a peripheral device;
   receiving encapsulated peripheral data associated with the peripheral device from the computing device using the UIBC;
   decapsulating the peripheral data;
   generating a reverse tunnel identifier that identifies a source device;
   transmitting the reverse tunnel identifier to the computing device;
   receiving additional peripheral data associated with the peripheral device;
   encapsulating the additional received peripheral data; and
   transmitting the encapsulated additional peripheral to the computing device using the UIBC.
2. The method of claim 1, wherein the computing device comprises a sink device,
   wherein receiving the encapsulated peripheral comprises receiving the encapsulated peripheral data from the sink device at a source device using the UIBC.
3. The method of claim 2, further comprising:
   transmitting the decapsulated peripheral data to a host interface controller of the source device.

4. The method of claim 1, wherein the computing device comprises a source device, wherein receiving the encapsulated peripheral data comprises receiving the encapsulated peripheral data from the source device at a sink device using the UIBC.

5. The method of claim 4, further comprising: enumerating an interface of a peripheral device that is connected to the sink device before establishing the bi-directional UIBC to the source device.

6. The method of claim 4, further comprising:
transmitting the decapsulated peripheral data to a peripheral device that is connected to the sink device.

7. The method of claim 1, wherein the encapsulated peripheral data is encapsulated in a UIBC packet.

8. A method comprising:
establishing a bi-directional user interface back channel (UIBC) to a computing device;
transmitting a tunnel identifier value associated with the UIBC that identifies a peripheral device;
receiving peripheral data associated with the peripheral device;
encapsulating the peripheral data;
transmitting the encapsulated peripheral data to the computing device using the UIBC;
receiving a reverse tunnel identifier from the computing device, wherein the reverse tunnel identifier identifies the computing device to a second, different computing device;
receiving encapsulated peripheral data associated with the peripheral device from the computing device using the UIBC; and
decapsulating the encapsulated received peripheral data.

9. The method of claim 8, wherein the computing device comprises a source device, and wherein transmitting the encapsulated peripheral data comprises transmitting the peripheral data to the source device from a sink device using the UIBC.

10. The method of claim 9, wherein receiving the peripheral data comprises receiving the peripheral data from a peripheral device of the sink device.

11. The method of claim 9, the method further comprising:
enumerating an interface of a peripheral device of the sink device before establishing the bi-directional UIBC to the source device.

12. The method of claim 8, wherein the computing device comprises a sink device, and wherein transmitting the encapsulated peripheral data comprises transmitting the peripheral data to the sink device from a source device using the UIBC.

13. The method of claim 12, wherein receiving the peripheral data comprises receiving the peripheral data from a host interface controller.

14. The method of claim 8, wherein the encapsulated peripheral data is encapsulated in a UIBC packet.

15. A first computing device comprising:
a user interface back channel (UIBC) module configured to:
establish a bi-directional user interface back channel (UIBC) to a second computing device;
receive a tunnel identifier value associated with the UIBC that identifies a peripheral device;
receive encapsulated peripheral data associated with the peripheral device from the second computing using the UIBC;
decapsulate the peripheral data;
generate a reverse tunnel identifier that identifies the first computing device to the second computing device;
transmit the reverse tunnel identifier to the second computing device;
receive additional peripheral data associated with the peripheral device;
encapsulate the additional received peripheral data; and
transmit the encapsulated additional peripheral data to the second computing device using the UIBC.

16. The first computing device of claim 15, wherein the first computing device comprises a source device, wherein the second computing device comprises a sink device, and wherein to receive the encapsulated peripheral data, the UIBC module is configured to:
receive the encapsulated peripheral data from the sink device at the source device using the UIBC.

17. The first computing device of claim 16, wherein the UIBC module is further configured to:
transmit the decapsulated peripheral data to a host interface controller of the source device.

18. The first computing device of claim 15, wherein the first computing device comprises a sink device, wherein the second computing device comprises a source device, and wherein to receive the encapsulated peripheral data, the UIBC module is configured to:
receive the encapsulated peripheral data from the source device at the sink device using the UIBC.

19. The first computing device of claim 18, wherein the UIBC module is further configured to:
enumerate an interface of a peripheral device of the sink device before establishing the bi-directional UIBC to the second device.

20. The first computing device of claim 18, wherein the UIBC module is further configured to:
transmit the decapsulated peripheral data to a peripheral device that is connected to the sink device.

21. The first computing device of claim 15, wherein the encapsulated peripheral data is encapsulated in a UIBC packet.

22. A first computing device comprising:
a user interface back channel (UIBC) module configured to:
establish a bi-directional user interface back channel (UIBC) to a second computing device;
transmit a tunnel identifier value associated with the UIBC that identifies a peripheral device;
receive peripheral data associated with the peripheral device;
encapsulate the peripheral data;
transmit the encapsulated peripheral data to the second computing device using the UIBC;
receive a reverse tunnel identifier from the second computing device that identifies the second computing device to the first computing device;
receive additional encapsulated peripheral data from the second computing device using the UIBC; and
decapsulate the additional encapsulated peripheral data.

23. The first computing device of claim 22, wherein the first computing device comprises a sink device, wherein the second computing device comprises a source device, and wherein to transmit the encapsulated peripheral data, the UIBC module is configured to:
transmit the peripheral data to the source device from the sink device using the UIBC.

24. The first computing device of claim 23, wherein to receive the peripheral data, the UIBC module is configured to:
receive the peripheral data from a peripheral device of the sink device.

25. The first computing device of claim 23, wherein the UIBC module is further configured to:
enumerate an interface of a peripheral device that is connected to the sink device before establishing the bi-directional UIBC to the source device.

26. The first computing device of claim 22, wherein the first computing device comprises a source device, wherein the second computing device comprises a sink device, and wherein to receive the encapsulated peripheral data, the UIBC module is configured to:
receive the encapsulated peripheral data from the sink device at the source device using the UIBC.

27. The first computing device of claim 22, wherein to receive the peripheral data, the UIBC module is further configured to:
receive the peripheral data from a host interface controller.

28. The first computing device of claim 22, wherein the encapsulated peripheral data is encapsulated in a UIBC packet.

29. A first computing device comprising:
means for establishing a bi-directional user interface back channel (UIBC) to a second computing device;
means for receiving a tunnel identifier value associated with the UIBC that identifies a peripheral device;
means for receiving encapsulated peripheral data associated with the peripheral device from the second computing device using the UIBC;
means for decapsulating the peripheral data;
means for generating a reverse tunnel identifier that identifies the first computing device to the second computing device;
means for transmitting the reverse tunnel identifier to the second computing device;
means for receiving additional peripheral data associated with the peripheral device;
means for encapsulating the additional peripheral data; and
means for transmitting the encapsulated peripheral data for the peripheral device to the second computing device using the UIBC.

30. A first computing device comprising:
means for establishing a bi-directional user interface back channel (UIBC) to a second computing device;
means for transmitting a tunnel identifier value associated with the UIBC that identifies a peripheral device;
means for receiving peripheral data associated with the peripheral device;
means for encapsulating the peripheral data;
means for transmitting the encapsulated peripheral data to the second computing device using the UIBC;
means for receiving a reverse tunnel identifier from the computing device, wherein the reverse tunnel identifier identifies the computing device to a second, different computing device;
means for receiving additional encapsulated peripheral data from the second computing device using the UIBC; and
means for decapsulating the additional encapsulated peripheral data.

31. A computer-readable storage medium including instructions stored thereon that when executed cause one or more processors to:
establish a bi-directional user interface back channel (UIBC) to a computing device;
receive a tunnel identifier value associated with the UIBC that identifies a peripheral device;
receive encapsulated peripheral data associated with the peripheral device from the computing device using the UIBC;
decapsulate the peripheral data;
generate a reverse tunnel identifier that identifies a source device;
transmit the reverse tunnel identifier to the computing device;
receive additional peripheral data associated with the peripheral device;
encapsulate the additional received peripheral data; and
transmit the encapsulated additional peripheral data to the computing device using the UIBC.

32. A computer-readable storage medium including instructions stored thereon that when executed cause one or more processors to:
establish a bi-directional user interface back channel (UIBC) to a computing device;
transmit a tunnel identifier value associated with the UIBC that identifies a peripheral device;
receive peripheral data associated with the peripheral device;
encapsulate the peripheral data;
transmit the encapsulated peripheral data to the computing device using the UIBC; and
receive a reverse tunnel identifier from the computing device, wherein the reverse tunnel identifier identifies the computing device to a second, different computing device;
receive additional encapsulated peripheral data from the computing device using the UIBC; and
decapsulate the additional encapsulated peripheral data.

* * * * *